US010949076B2

United States Patent
Seo et al.

(10) Patent No.: US 10,949,076 B2
(45) Date of Patent: Mar. 16, 2021

(54) FLEXIBLE DISPLAY APPARATUS AND DISPLAY METHOD THEREOF

(71) Applicant: SAMSUNG ELECTRONICS CO., LTD., Suwon-si (KR)

(72) Inventors: Joon-kyu Seo, Suwon-si (KR); Hyun-jin Kim, Seoul (KR); Nipun Kumar, Suwon-si (KR); Jung-joo Sohn, Seoul (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/291,531

(22) Filed: Mar. 4, 2019

(65) Prior Publication Data

US 2019/0196685 A1  Jun. 27, 2019

Related U.S. Application Data

(63) Continuation of application No. 14/029,234, filed on Sep. 17, 2013, now Pat. No. 10,261,682.

(30) Foreign Application Priority Data

Sep. 17, 2012 (KR) ........................ 10-2012-0102633

(51) Int. Cl.
*G06F 3/0487* (2013.01)
*G06F 3/041* (2006.01)
(Continued)

(52) U.S. Cl.
CPC .......... *G06F 3/0487* (2013.01); *G06F 1/1652* (2013.01); *G06F 3/0412* (2013.01); *G06F 2203/04102* (2013.01); *H04M 1/0268* (2013.01)

(58) Field of Classification Search
CPC .... G06F 3/0412; G06F 3/0487; G06F 3/0482; G06F 3/14; G06F 3/01; G06F 3/048; G06F 1/1652; G06F 1/1626; G06F 1/1694; G06F 2203/04102; H04M 1/0268; H04M 1/2477; H04M 1/72583; G09G 3/20
See application file for complete search history.

(56) References Cited

U.S. PATENT DOCUMENTS 8,082,003 B2   12/2011   Jee
8,543,166 B2    9/2013   Choi et al.
(Continued)

FOREIGN PATENT DOCUMENTS

CN    101393511 A    3/2009
CN    102508612 A    6/2012
(Continued)

OTHER PUBLICATIONS

Communication dated Feb. 19, 2019, issued by the State Intellectual Property Office of P.R. China in counterpart Chinese Patent Application No. 201380048239.X.
(Continued)

*Primary Examiner* — David Tung
(74) *Attorney, Agent, or Firm* — Sughrue Mion, PLLC

(57) ABSTRACT

A flexible display apparatus configured to sense deformation of the flexible display apparatus, control display of an object displayed on the flexible display apparatus based on the deformation, and execute operations based on the displayed object.

18 Claims, 36 Drawing Sheets

(51) Int. Cl.
    *G06F 1/16*     (2006.01)
    *H04M 1/02*     (2006.01)
    *G06F 3/0482*     (2013.01)
    *G06F 3/14*     (2006.01)
    *G09G 3/20*     (2006.01)
    *H04M 1/247*     (2006.01)
    *H04M 1/725*     (2006.01)
    *G06F 3/01*     (2006.01)
    *G06F 3/048*     (2013.01)

(56) References Cited

U.S. PATENT DOCUMENTS

| | | | |
|---|---|---|---|
| 8,654,075 | B2 | 2/2014 | Kim |
| 8,707,175 | B2 | 4/2014 | Lee |
| 2009/0219247 | A1 | 9/2009 | Watanabe et al. |
| 2010/0001967 | A1* | 1/2010 | Yoo .................. G06F 3/0488 345/173 |
| 2010/0011291 | A1 | 1/2010 | Nurmi |
| 2010/0056223 | A1 | 3/2010 | Choi et al. |
| 2010/0117975 | A1 | 5/2010 | Cho |
| 2010/0120470 | A1 | 5/2010 | Kim et al. |
| 2010/0141605 | A1 | 6/2010 | Kang et al. |
| 2010/0257490 | A1* | 10/2010 | Lyon .................. G06F 3/0488 715/863 |
| 2010/0269040 | A1 | 10/2010 | Lee |
| 2011/0105193 | A1 | 5/2011 | Lee |
| 2011/0193771 | A1* | 8/2011 | Chronqvist .......... G06F 3/0414 345/156 |
| 2011/0227822 | A1 | 9/2011 | Shai |
| 2012/0038613 | A1 | 2/2012 | Choi |
| 2012/0053887 | A1 | 3/2012 | Nurmi |
| 2012/0133621 | A1* | 5/2012 | Kim .................... H04M 1/0206 345/204 |
| 2012/0190336 | A1 | 7/2012 | Nakao |
| 2012/0223890 | A1 | 9/2012 | Borovsky |
| 2013/0300732 | A1* | 11/2013 | Hosoya ................ G06F 1/1694 345/419 |

FOREIGN PATENT DOCUMENTS

| | | |
|---|---|---|
| CN | 102566816 A | 7/2012 |
| EP | 2 192 750 A2 | 6/2010 |
| EP | 2458829 A2 | 5/2012 |
| KR | 10-2009-0034218 A | 4/2009 |
| KR | 10-2010-0027501 A | 3/2010 |
| KR | 10-2010-0114779 A | 10/2010 |
| KR | 10-1664418 B1 | 10/2016 |
| RU | 105060 U1 | 5/2011 |
| WO | 2012/028773 A1 | 3/2012 |

OTHER PUBLICATIONS

Australian Office Action dated Oct. 16, 2018 issued by the Australian Patent Office in counterpart Australian Application No. 2013316225.
Australian Office Action dated Jan. 8, 2019 issued by the Australian Patent Office in counterpart Australian Application No. 2013316225.
Communication dated Jun. 21, 2018, issued by the Australian Patent Office in counterpart Australian Patent Application No. 2013316225.
Communication dated Mar. 6, 2018, issued by the European Patent Office in counterpart European Application No. 13184716.2.
Communication dated May 3, 2018, issued by the State Intellectual Property Office of P.R. China in counterpart Chinese Application No. 201380048239.X.
Communication dated Sep. 19, 2017, from the Russian Patent Office in counterpart Application No. 2015114172/08.
Communication dated Sep. 20, 2017, from the State Intellectual Property Office of People's Republic of China in counterpart Application No. 201380048239.X.
Communication dated Apr. 27, 2017, issued by the Ministry of Science and Technology National Office of Intellectual Property in counterpart Vietnamese Application No. 1-2015-01350.
Communication dated Jan. 25, 2017, issued by the State Intellectual Property Office of the People's Republic of China in counterpart Chinese Patent Application No. 201380048239.X.
Communication dated Feb. 20, 2017, issued by the European Patent Office in counterpart European Patent Application No. 13184716.2.
Communication dated Jul. 5, 2016, issued by the Singaporean Patent Office in counterpart Singaporean Application No. 11201500332R.
Communication dated Mar. 7, 2016, issued by the European Patent Office in counterpart European Application No. 13184716.2.
Communication dated Dec. 14, 2015, issued by the Intellectual Property Office of Singapore in counterpart Singaporean Patent Application No. 11201500332R.
International Search Report dated Jan. 22, 2014 issued in International Application No. PCT/KR2013/008461 (PCT/ISA/210).
Written Opinion dated Jan. 22, 2014 issued in International Application No. PCT/KR/2013/008461 (PCT/ISA/237).
Communication dated Sep. 12, 2019, issued by the State Intellectual Property Office of P.R. China in counterpart Chinese Application No. 201380048239.X.
Communication dated Oct. 31, 2019, issued by the Korean Intellectual Property Office in counterpart Korean Patent Application No. 10-2012-0102633.
Communication dated Apr. 19, 2019, issued by the Korean Intellectual Property Office in counterpart Korean Application No. 10-2012-0102633.
Communication dated Dec. 23, 2019, issued by the State Intellectual Property Office of People's Republic of China in counterpart Chinese Application No. 201380048239.X.
Communication dated Jan. 9, 2020, issued by the Korean Intellectual Property Office in counterpart Korean Application No. 10-2012-0102633 (Decision of Dismissal of Amendment).
Communication dated Jan. 9, 2020, issued by the Korean Intellectual Property Office in counterpart Korean Application No. 10-2012-0102633 (Decision of Rejection).
Communication dated Feb. 20, 2020, issued by the Korean Intellectual Property Office in counterpart Korean Application No. 10-2020-0015896 (Notice of Allowance).
Communication dated Mar. 19, 2020, issued by the Indian Patent Office in counterpart Indian Application No. 2881/DELNP/2015.
Communication dated Aug. 21, 2020, issued by the Korean Intellectual Property Office in Korean Patent Application No. 10-2020-0061209.

* cited by examiner (a)

(b)

(a)

(b)

(c)

FLEXIBLE DISPLAY APPARATUS AND DISPLAY METHOD THEREOF

CROSS-REFERENCE TO RELATED APPLICATION

This application is a continuation application of U.S. patent application Ser. No. 14/029,234, filed on Sep. 17, 2013, in the U.S. Patent and Trademark Office, which claims priority from Korean Patent Application No. 10-2012-0102633, filed on Sep. 17, 2012, in the Korean Intellectual Property Office, the disclosures of which are herein incorporated by reference in their entireties.

BACKGROUND

1. Field

Apparatuses and methods consistent with exemplary embodiments relate to a flexible display apparatus and a display method thereof, and more particularly, to a flexible display apparatus which includes a display which can have its shape changed, and a display method thereof.

2. Description of the Related Art

With the development of electronic technologies, various kinds of display apparatuses have been developed. In particular, display apparatuses, such as television (TVs), personal computers (PCs), laptops, tablet PCs, mobile phones, and MP3 players, are widely used to such an extent that they can be found in most households.

In order to meet consumer demands for new functions and new forms of displays, an effort to develop new forms of displays is ongoing. One result of this effort is a next generation display apparatus in the form of a flexible display apparatus.

The flexible display apparatus is a display apparatus that can be deformed into different shapes and configurations.

The flexible display apparatus can be deformed by a force that is applied by a user, and thus the flexible display apparatus may be used for various purposes. For instance, the flexible display apparatus may be used as a mobile phone, a tablet PC, an electronic album, a personal digital assistant (PDA), and an MP3 player.

The flexible display apparatus has flexibility unlike existing display apparatuses. Considering this characteristic, there is a need for a method of applying a bending gesture as an input method for a flexible display apparatus.

SUMMARY

One or more exemplary embodiments may overcome the above disadvantages and other disadvantages not described above. However, it is understood that the exemplary embodiments are not required to overcome the disadvantages described above, and may not overcome any of the problems described above.

One or more exemplary embodiments provide a flexible display apparatus, which can use a bending gesture as an input method, and a display method thereof.

According to an aspect of an exemplary embodiment, there is provided a flexible display apparatus including: a flexible display; a sensor configured to sense a deformation of the flexible display apparatus; and a controller configured to control the flexible display to display an object at a first location on the flexible display, determine a second location of the object on the flexible display based on the deformation, and execute a function of the flexible display apparatus associated with the second location.

The controller may be configured to control the flexible display to display a lock screen, and the controller may be configured to determine whether the second location is associated with unlocking of the lock screen, and is configured to unlock the lock screen in response to determining that the second location is associated with unlocking of the lock screen.

The controller may be configured to unlock and execute an application associated with the second location in response to determining that the second location is associated with unlocking of the lock screen.

The controller may be configured to display a main screen in response to unlocking the lock screen.

The controller may be configured to determine the second location according to a degree of the deformation.

According to an aspect of another exemplary embodiment, there is provided a display method of a flexible display apparatus, the method including: displaying an object at a first location on a flexible display of the flexible display apparatus; sensing deformation of the flexible display apparatus; determining a second location of the object on the flexible display based on the deformation; and executing a function of the flexible display apparatus associated with the second location.

The function may be to unlock a lock screen of the flexible display apparatus.

The function may be to unlock the lock screen and display a main screen of the flexible display apparatus.

According to the various exemplary embodiments described above, the bending of the display may be used an input method to execute various functions. Accordingly, user convenience is improved.

BRIEF DESCRIPTION OF THE DRAWINGS

The above and other aspects will be more apparent by describing in detail exemplary embodiments, with reference to the accompanying drawings, in which.

DETAILED DESCRIPTION OF EXEMPLARY EMBODIMENTS

Figure 1:
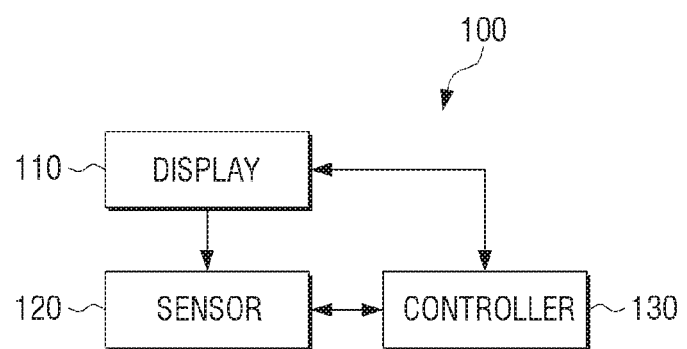
FIG. 1 is a block diagram illustrating a flexible display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments may be carried out without those specifically defined matters. Also, functions or elements known in the related art are not described in detail since they would obscure the exemplary embodiments with unnecessary detail.

FIG. 1 is a block diagram illustrating a flexible display apparatus according to an exemplary embodiment. Referring to FIG. 1, a flexible display apparatus 100 includes a display 110, a sensor 120, and a controller 130.

The flexible display apparatus 100 of FIG. 1 may be implemented using various types of portable apparatuses having a display function, such as a mobile phone, a smartphone, a portable multimedia player (PMP), a personal digital assistant (PDA), a tablet PC, and a navigation system. Also, the flexible display apparatus 100 may be implemented in a stationary type apparatus, such as a monitor, a television (TV), and a kiosk, in addition to the portable apparatus.

The display 110 displays various screens. Specifically, the display 110 may display a playback screen or an execution screen of content, such as an image, a moving image, a text, and music, and may display various user interface (UI) screens. For example, when various contents are played back through applications installed in the flexible display apparatus 100, the display 110 may display a content playback screen provided by a corresponding application.

The flexible display apparatus 100, including the display 110, can be bent (e.g., deformed). Accordingly, the flexible display apparatus 100 and the display 110 should have a flexible structure and be made of a flexible material. Hereinafter, a detailed configuration of the display 110 will be explained with reference to FIG. 2.

Figure 2:
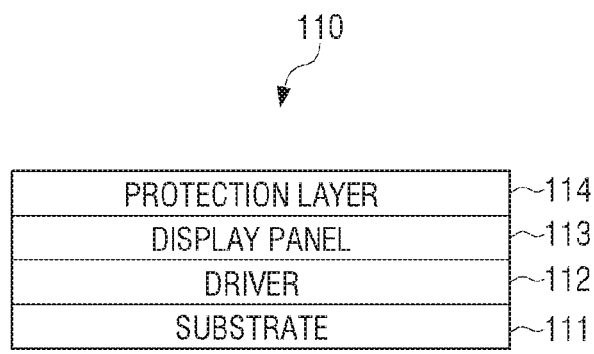
FIG. 2 is a view illustrating a basic configuration of a display of a flexible display apparatus according to an exemplary embodiment.

FIG. 2 is a view to illustrate a basic configuration of the display which constitutes the flexible display apparatus according to an exemplary embodiment. Referring to FIG. 2, the display 110 includes a substrate 111, a driver 112, a display panel 113, and a protection layer 114.

The flexible display apparatus may be an apparatus that can be bent, deformed, crooked, folded or rolled like paper, while maintaining display characteristics of a flat panel display apparatus. Accordingly, the flexible display apparatus should be manufactured on a flexible substrate.

Specifically, the substrate 111 may be implemented by using a plastic substrate (for example, a polymer film) deformable by an external pressure.

The plastic substrate has a structure formed by barrier coating opposite surfaces of a base film. The base film may be implemented by using various resins such as polyimide (PI), polycarbonate (PC), polyethyleneterephtalate (PET), polyethersulfone (PES), polythylenenaphthalate (PEN), and fiber reinforced plastic (FRP). The barrier coating is performed on the opposite surfaces of the base film. An organic membrane or an inorganic membrane may be used for the purpose of maintaining flexibility.

The substrate 111 may also be formed of a flexible material such as thin glass or metal foil.

The driver 112 drivers the display panel 113. Specifically, the driver 112 applies a driving voltage to a plurality of pixels which constitute the display panel 113, and may be implemented by using a-si TFT, a low temperature poly silicon (LTPS) TFT, or an organic TFT (OTFT) and so on. The driver 112 may also be implemented in various forms according to the form of the display panel 113. For instance, the display panel 113 may consist of an organic light emitting substance which includes a plurality of pixel cells, and an electrode layer which covers opposite surfaces of the organic light emitting substance. In this case, the driver 112 may include a plurality of transistors corresponding to the plurality of pixel cells of the display panel 113. The controller 130 applies an electric signal to a gate of each transistor and controls the pixel cells connected to the transistors to emit light. Accordingly, an image is displayed.

The display panel 113 may be implemented by using an electroluminescent display (EL), an electrophoretic display (EPD), an electrochromic display (ECD), a liquid crystal display (LCD), an active matrix LCD (AMLCD), and a plasma display panel (PDP), besides an organic light emitting diode (OLED). When the display panel 113 is embodied by the LCD, the display panel cannot emit light by itself and thus may require a separate backlight unit. When the LCD does not use backlight, the LCD may use ambient light. In order to use the LCD display panel 113 without the backlight unit, an environment, such as a lighted outdoor environment, may be used to operate the LCD.

The protection layer 114 protects the display panel 113. For example, the protection layer 114 may be made of ZrO, CeO2, or Th O2. The protection layer 114 may be manufactured as a transparent film and may cover the entire surface of the display panel 113.

The display 110 may also be implemented by using electronic paper (e-paper). The e-paper is a display that applies general ink characteristics to paper, and is different from a general flat panel display in that the e-paper uses reflected light. The electronic paper may change a picture or text using electrophoresis, which uses a twist ball or a capsule.

When the display 110 is comprised of elements made of a transparent material, the display 110 may be implemented as a display apparatus that is bendable and transparent. For example, when the substrate 111 is made of a polymer material, such as plastic having transparency, when the driver 112 is implemented by using a transparent transistor, and when the display panel 113 is implemented by using a transparent organic light emitting layer and a transparent electrode, the display 110 may have transparency.

The transparent transistor refers to a transistor that is manufactured by substituting opaque silicon of an existing thin film transistor with a transparent material, such as zinc oxide or titanium oxide. The transparent electrode may be made of advanced materials such as indium tin oxide (ITO) or graphene. Graphene refers to a material that has a planar structure of a honeycomb shape in which carbon atoms are connected to one another, and has transparency. The transparent organic light emitting layer may be implemented by using various materials.

As described above, the display 110 may be deformed by an external force and thus have its shape changed. Hereinafter, a method for sensing deformation of the flexible display apparatus 100 will be explained with reference to FIGS. 3 to 5.

Figure 3:
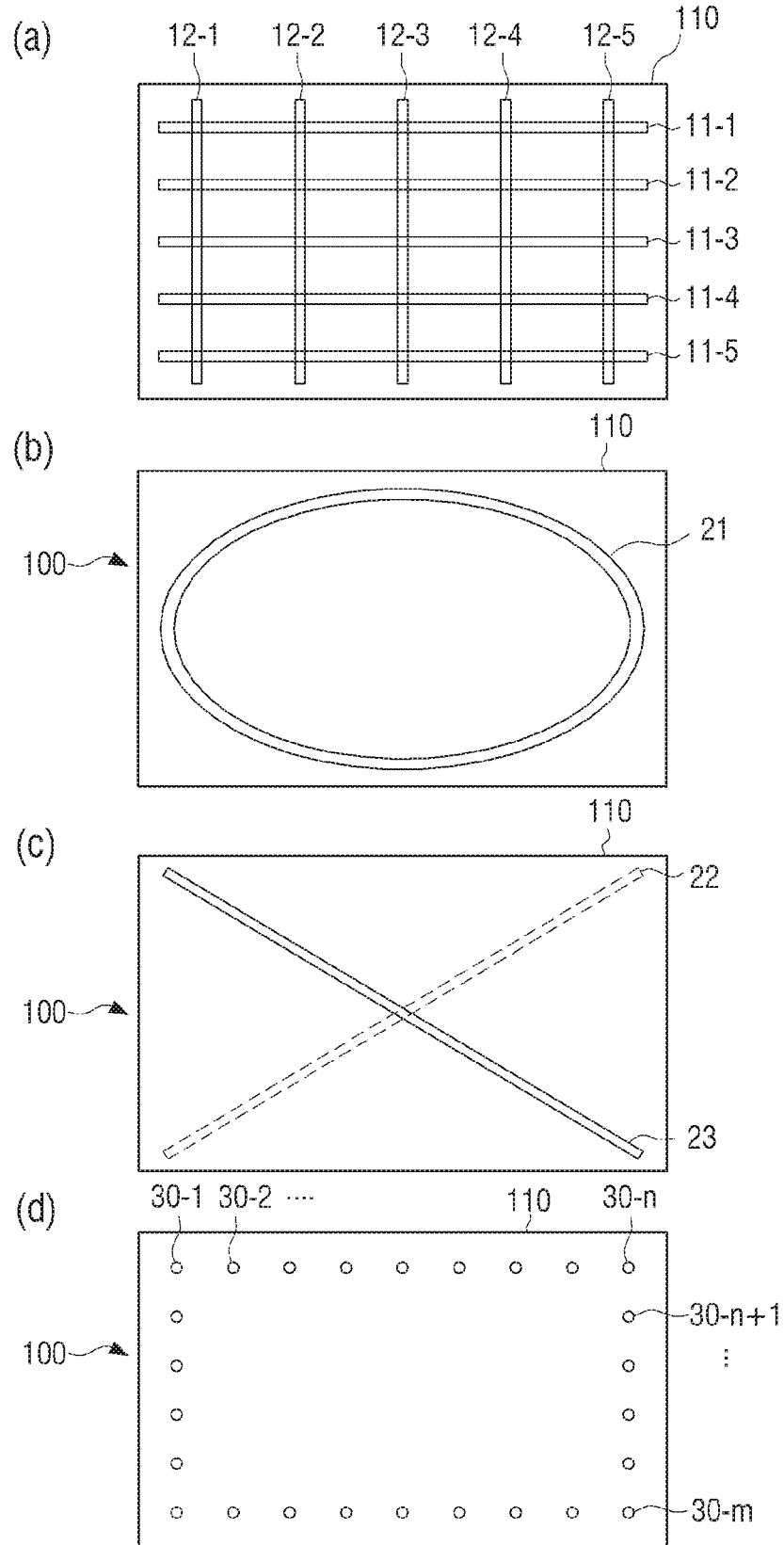
FIGS. 3 to 5 are views illustrating examples of a method for sensing bending of a flexible display apparatus according to an exemplary embodiment.
Figure 4:
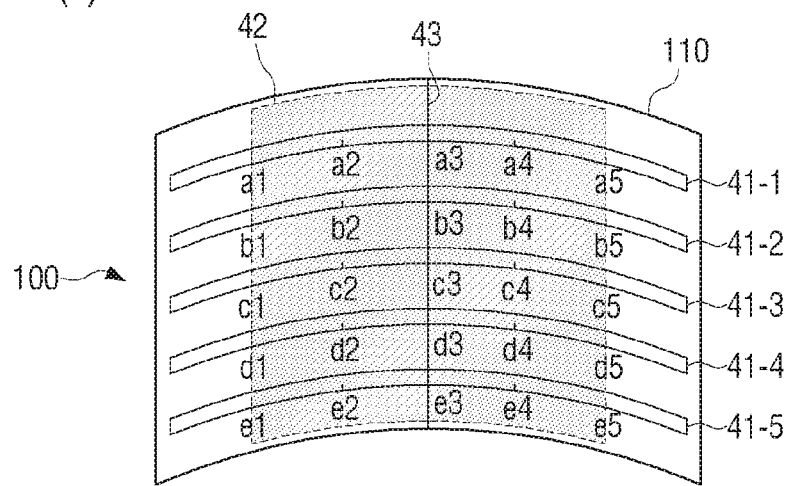
Figure 4:
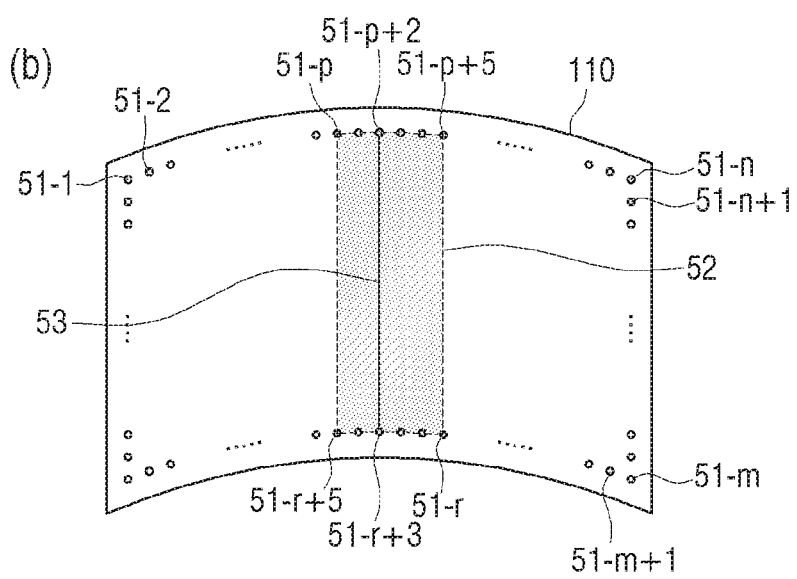
Figure 5:
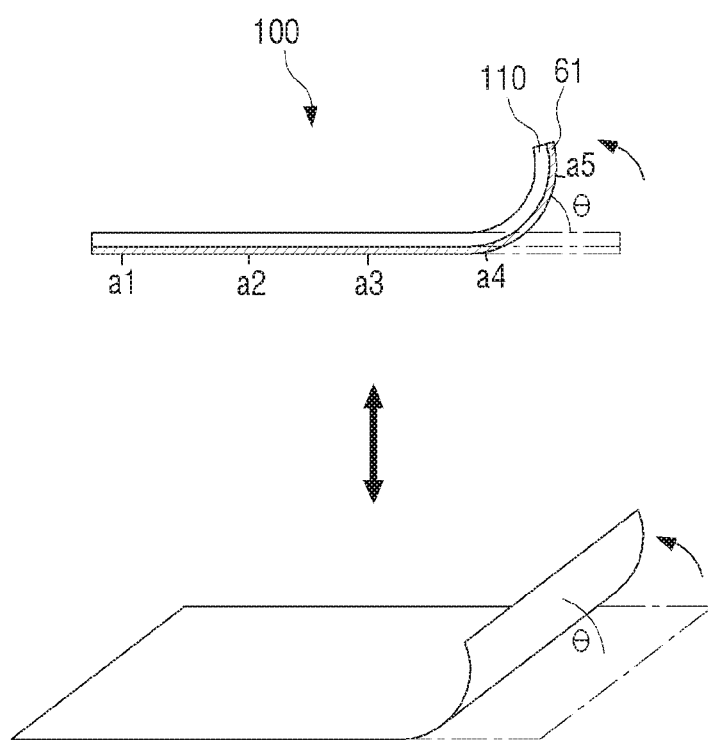

FIGS. 3 to 5 are views to illustrate an example of a method for sensing deformation of the flexible display apparatus according to an exemplary embodiment.

The sensor 120 senses bending of the display 110. The "bending" recited herein refers to a state in which the display 110 is bent. Although bending is described herein, bending is merely an exemplary deformation, and other deformations (e.g., rolling, folding, twisting, etc.) may be detected by the sensor 120.

To sense the deformation, the sensor 120 includes a bend sensor disposed on one surface, such as a front surface or a rear surface of the display 110, or a bend sensor which is disposed on opposite surfaces of the display 110.

The bend sensor refers to a sensor that can be bent and has a resistance value which varies according to a degree of bending. The bend sensor may be implemented in various forms such as an optical fiber bend sensor, a pressure sensor, and a strain gauge.

FIG. 3 is a view illustrating arrangements of bend sensors according to an exemplary embodiment.

View (a) of FIG. 3 illustrates an example of a plurality of bar-shaped bend sensors arranged in the display 110 in a vertical direction and a horizontal direction in a grid pattern. Specifically, the bend sensors includes bend sensors 11-1 to 11-5 arranged in a first direction, and bend sensors 12-1 to 12-5 arranged in a second direction perpendicular to the first direction. The bend sensors are disposed away from one another by a predetermined distance.

In view (a) of FIG. 3, five bend sensors (11-1 to 11-5, 12-1 to 12-5) are arranged in each of the horizontal direction and the vertical direction in a grid formation. However, this is merely an example and the arrangement configuration and the number of bend sensors may be changed according to a size of the display 110. The bend sensors are arranged in the horizontal direction and the vertical direction to sense bending from the entire area of the display 110. Therefore, when only a part of the flexible display apparatus is flexible or when the flexible display apparatus needs to sense bending from only a part of the apparatus, the bend sensor may be arranged in only a corresponding portion of the apparatus.

The bend sensors may be embedded in a front surface of the display 110 as shown in view (a) of FIG. 3. However, this is merely an example and the bend sensors may be embedded in a rear surface of the display 110 or may be embedded in both surfaces.

Also, the shapes, number, and locations of the bend sensors may be variously changed. For example, a single bend sensor or a plurality of bend sensors may be connected with the display 110. The single bend sensor may sense a single bending data and may have a plurality of sensing channels to sense a plurality of bending data.

View (b) of FIG. 3 illustrates an example of a single bend sensor which is disposed on one surface of the display 110. As shown in view (b) of FIG. 3, a bend sensor 21 may be arranged in the front surface of the display 110 in a circular form. However, this is merely an example, and the bend sensor may be arranged in the rear surface of the display 110 and may be implemented in a form of a looped curve forming various polygons, such as a quadrangle.

View (c) of FIG. 3 illustrates two intersecting bend sensors. Referring to view (c) of FIG. 3, a first bend sensor 22 is disposed on a first surface of the display 110 in a first diagonal direction, and a second bend sensor 23 is disposed on a second surface of the display 110 in a second diagonal direction.

Although line type bend sensors are used in the above-described various exemplary embodiments, the sensor 120 may sense bending using a plurality of strain gages.

View (d) of FIG. 3 illustrates a plurality of strain gages arranged in the display 110. The strain gage uses metal or a semiconductor in which a resistance is greatly changed according to an applied force, and senses deformation of a surface of an object to be measured according to a change in the resistance value. It is common that a material, such as metal, increases a resistance value if its length is stretched by an external force, and decreases the resistance value if the length is contracted. Accordingly, bending is sensed by sensing a change in the resistance value.

Referring to view (d) of FIG. 3, a plurality of strain gages 30-1, 30-2, . . . , 30-n, . . . , 30-m, . . . ) are arranged along an edge of the display 110. The number of strain gages may be changed according to a size or a shape of the display 110, or sensing of predetermined bending, and a resolution, etc.

Hereinafter, a method for the sensor 120 to sense bending of the display 110 using bend sensors arranged in a grid formation or strain gages will be explained.

The bend sensor may be implemented by using an electric resistance sensor which uses an electric resistance, or a micro optical fiber sensor which uses a strain of an optical fiber. Hereinafter, the bend sensor will be explained with the assumption that the bend sensor is the electric resistance sensor for the convenience of explanation.

FIG. 4 is a view to illustrate a method for sensing bending of the flexible display apparatus according to an exemplary embodiment.

When the display 110 is bent, the bend sensors, which are arranged on one surface or opposite surfaces of the display 110, are also bent and output resistance values corresponding to a magnitude of exerted tension.

That is, the sensor 120 may sense a resistance value of the bend sensor using a level of a voltage applied to the bend sensor or an intensity of a current flowing in the bend sensor, and may sense bending of the display 110 using the sensed resistance value.

For instance, when the display 110 is bent in a horizontal direction, as shown in view (a) of FIG. 4, bend sensors 41-1 to 41-5 which are embedded in the front surface of the display 110 are also bent and outputs a resistance value according to a magnitude of exerted tension.

In this case, the magnitude of the tension increases in proportion to a degree of bending. For example, when the display 110 is bent, as shown in view (a) of FIG. 4, the greatest bending occurs in the center area. Accordingly, the greatest tension is exerted at a point a3 of the bend sensor 41-1, a point b3 of the bend sensor 41-2, a point c3 of the bend sensor 41-3, a point d3 of the bend sensor 41-4, and a point e3 of the bend sensor 41-5, which are the center area, and accordingly, the bend sensors 41-1 to 41-5 have the greatest resistance value at the points a3, b3, c3, d3, and e3.

On the other hand, the degree of bending gradually decreases toward the edges of the ben sensors. Accordingly, the bend sensor 41-1 has smaller resistance values as at points away from the point a3 to the right and left, and has the same resistance value as that before the bending occurs at the point a1 at a left area of the point a1 and at a right area of the point a5 where bending does not occur. The same resistance is applicable to the other bend sensors 41-2 to 41-5.

The controller 140 may determine bending of the display 110 based on a result of sensing by the sensor 120. Specifically, the controller 130 may determine a location of a bending area, a size of a bending area, a number of bending areas, a size of a bending line, a location of a bending line, a number of bending lines, a direction of a bending line, and a number of times that bending occurs, based on a relationship between points where a change in the resistance value of the bend sensor is sensed.

A bending area is an area in which the display 110 is bent. Since the bend sensor is also bent by bending the flexible display apparatus 100, all points at which the bend sensors output different resistance values from original values may delineate a bending area. On the other hand, an area that has no change in the resistance value may delineate a flat area in which bending is not performed, Accordingly, when a distance between the points at which the change in the resistance value is sensed lies within a predetermined distance, the points are sensed as one bending area. On the other hand, when the distance between the points at which the change in the resistance value is sensed lies beyond the predetermined distance, different bending areas are delineated with reference to these points.

As described above, in view (a) of FIG. 4, when bent, the resistance values from the points a1 to a5 of the bend sensor 41-1, from the points b1 to b5 of the bend sensor 41-2, from the points c1 to c5 of the bend sensor 41-3, from the points d1 to d5 of the bend sensor 41-4, and from the points e1 to e5 of the bend sensor 41-5 are different from the resistance values of the original state. In this case, the points at which the change in the resistance value is sensed in each bend sensor 41-1 to 41-5 are located within a predetermined distance and are continuously arranged.

Accordingly, the controller 130 determines an area 42, which includes all of the points, from the points a1 to a5 of the bend sensor 41-1, from the points b1 to b5 of the bend sensor 41-2, from the points c1 to c5 of the bend sensor 41-3, from the points d1 to d5 of the bend sensor 41-4, and from the points e1 to e5 of the bend sensor 41-5, as one bend area.

The bending area may include a bending line. The bending line refers a line which connects the points at which the greatest resistance value is sensed in each bending sensor. Accordingly, the controller 130 may determine a line connecting points at which the greatest resistance value is sensed in the bending area as a bending line.

For instance, in the case of view (a) of FIG. 4, a line 43, which connects the point a3 at which the greatest resistance value is output in the bend sensor 41-1, the point b3 at which the greatest resistance value is output in the bend sensor 41-2, the point c3 at which the greatest resistance value is output in the bend sensor 41-3, the point d3 at which the greatest resistance value is output in the bend sensor 41-4, and the point e3 at which the greatest resistance value is output in the bend sensor 41-5, may delineate a bending line. View (a) of FIG. 4 illustrates the bending line which is formed in the center area of the display surface in the vertical direction.

View (a) of FIG. 4 illustrates only the bend sensors that are arranged in the horizontal direction from among the bend sensors arranged in the grid formation to explain the case in which the display 110 is bent in the horizontal direction. That is, the sensor 120 may sense bending of the display 110 in the vertical direction through the bend sensors which are arranged in the vertical direction in the same method as the method for sensing bending in the horizontal direction. Also, when the display 110 is bent in the diagonal direction, tension is exerted to all of the bend sensors which are arranged in the horizontal and vertical directions. Therefore, the sensor 120 may sense bending of the display 110 in the diagonal direction based on outputs values of the bend sensors arranged in the horizontal and vertical directions.

Also, the sensor 120 may sense bending of the display 110 using a strain gage.

Specifically, when the display 110 is bent, a force is applied to strain gages arranged along an edge of the display 110, and the strain gages output different resistance values according to the applied force. Accordingly, the controller 130 may determine a location of a bending area, a size of a bending area, a number of bending areas, a size of a bending line, a location of a bending line, a number of bending lines, a direction of a bending line, and a number of times that bending occurs, based on output values of the strain gages.

For example, when the display 110 is bent in the horizontal direction, as shown in view (b) of FIG. 4, a force is applied to strain gages 51-$p$, . . . , 51-$p$+5, 51-$r$, . . . , 51-$r$+5 that are arranged around a bent area from among a plurality of strain gages embedded in the front surface of the display 110, and the strain gages 51-$p$, . . . , 51-$p$+5, 51-$r$, . . . , 51-$r$+5 output resistance values corresponding to the applied force. Accordingly, the controller 130 may determine an area 51 that includes all points at which the strain gages output resistance values different from those of the original state, as one bending area.

Also, the controller 130 may determine a line connecting at least two strain gages that output resistance values greatly different from those of the original state in the bending area as a bending line. That is, the controller 130 may determine a line connecting at least two strain gages to which the greatest force is applied, or at least two strain gages to which the greatest force and the next greatest force are applied as a bending line according to the bending of the display 110.

For example, when the display 110 is bent in the horizontal direction, as shown in view (b) of FIG. 4, the display 110 may determine a line connecting the first strain gage 51-$p$+2 and the second strain gage 51-$r$+3 that output resistance values greatly different from those of the original state as a bending line.

In the above-described exemplary embodiment, the strain gages 51-1, 51-2, . . . are embedded in the front surface of the flexible display apparatus 100. The strain gages 51-1, 51-2, . . . are embedded in the front surface of the flexible display apparatus 100 to sense bending when the flexible display apparatus 100 is bent in a Z+ direction.

A bending direction of the flexible display apparatus 100 may be defined according to a direction in which a convex area of the bent flexible display apparatus 100 points. That is, with the assumption that the front surface of the flexible display apparatus 100 is a two-dimensional x-y plane, when the convex area of the bent flexible display apparatus 100 points a z− direction of a z-axis perpendicular to the x-y plane, the bending direction of the flexible display apparatus 100 is a Z+ direction, and, when the convex area of the bent flexible display apparatus 100 points a z+ direction of the z-axis, the bending direction of the flexible display apparatus 100 is a Z− direction.

Therefore, the strain gages may be embedded in the rear surface of the flexible display apparatus 100 to sense bending of the flexible display apparatus 100 in the Z− direction. However, this is merely an example and the strain gages may be disposed in one surface of the flexible display apparatus 100 to sense bending in the Z+ direction and the Z− direction.

The sensor 120 may sense a degree of bending of the display 110, that is, a bending angle. The bending angle recited herein may refer to an angle formed when the display 110 is bent in comparison with a flat state of the display 110.

FIG. 5 is a view to illustrate a method for determining a bending angle of the display of the flexible display apparatus according to an exemplary embodiment.

The controller 130 may determine a bending angle of the display 110 based on a result of sensing by the sensor 120. To determine the bending angle, the flexible display apparatus 100 may pre-store resistance values output from a bending line according to a bending angle of the display 110. Accordingly, the controller 130 may compare a resistance value output from a bend sensor or strain gage disposed in the bending line when the display 110 is bent, with the pre-stored resistance values, and may determine a bending angle matching the sensed resistance value.

For example, when the display 110 is bent, as shown in FIG. 5, a bend sensor point a4 located in a bending line outputs the greatest resistance value. At this time, the flexible display apparatus 100 determines a bending angle (θ) that matches the resistance value output from the point a4 using the resistance values which are pre-stored according to the bending angles.

As described above, the bending direction of the flexible display apparatus 100 is divided into the Z+ direction and the Z− direction, and the sensor 120 may sense the bending direction of the flexible display apparatus 100 in various ways. A detailed description of this will be provided with reference to FIGS. 6 and 7.

Figure 6:
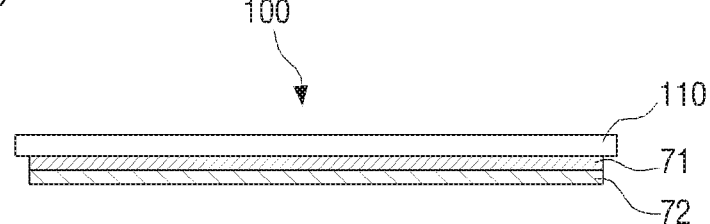
FIG. 6 is a view illustrating a method for sensing a bending direction using a bend sensor according to an exemplary embodiment.
Figure 6:
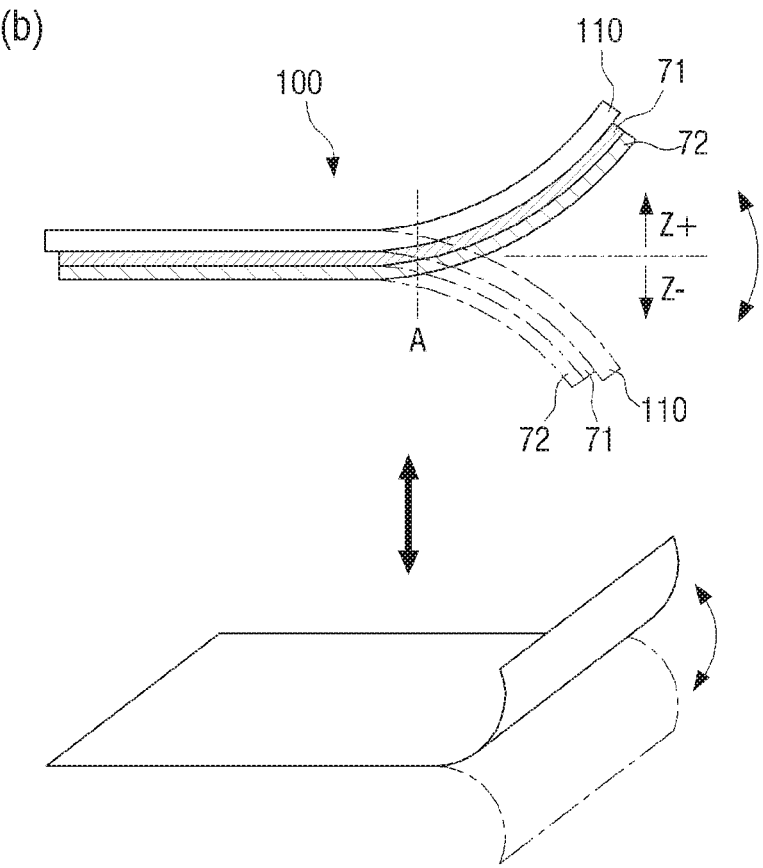
Figure 6:
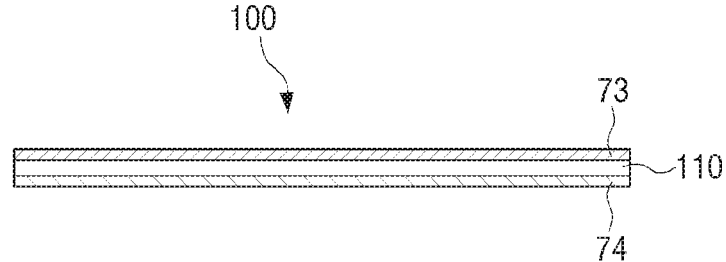

FIG. 6 is a view to illustrate a method for sensing a bending direction using a bend sensor according to an exemplary embodiment.

The controller 130 may determine a bending direction of the display 110 based on a result of sensing by the sensor 120. To determine the bending direction, the sensor 120 may include one or more bend sensors disposed various arrangements.

For example, the sensor 120 may include two bend sensors 71 and 72 disposed overlapping each other on one side of the display 110, as shown in view (a) of FIG. 6. In this case, when bending is performed in one direction, different resistance values are output from the upper bend sensor 71 and the lower bend sensor 72 at a point at which the bending is performed. Accordingly, the controller 130 may determine a bending direction by comparing the resistance values of the two bend sensors 71 and 72 at the same point.

Specifically, when the display 110 is bent in the Z+ direction, as shown in view (b) of FIG. 6, tension exerted to the lower bend sensor 72 is greater than that of the upper bend sensor 71 at a point 'A' corresponding to a bending line. On the other hand, when the display 110 is bent in the Z− direction, tension exerted to the upper bend sensor 71 is greater than that of the lower bend sensor 72.

Accordingly, the controller 130 may determine the bending direction by comparing the resistance values of the two bend sensors 71 and 72 at the point A. That is, the controller 130 may determine that the display 110 is bent in the Z+ direction when the resistance value output from the lower bend sensor of the two overlapping bend sensors is greater than the resistance value output from the upper bend sensor at the same point. The controller 130 may determine that the display 110 is bent in the Z− direction when the resistance value output from the upper bend sensor of the two overlapping bend sensors is greater than the resistance value output from the lower bend sensor at the same point.

Although the two bend sensors are disposed overlapping each other on one side of the display 110 in views (a) and (b) of FIG. 6, the sensor 120 may include bend sensors disposed on opposite surfaces of the display 110 as shown in view (c) of FIG. 6.

View (c) of FIG. 6 illustrates two bend sensors 73 and 74 disposed on the opposite surfaces of the display 110.

Accordingly, when the display 110 is bent in the Z+ direction, the bend sensor disposed on a first surface of the opposite surfaces of the display 110 is subject to a compressive force, whereas the bend sensor disposed on a second surface is subject to tension. On the other hand, when the display 110 is bent in the Z− direction, the bend sensor disposed on the second surface is subject to a compressive force, whereas the bend sensor disposed on the first surface is subject to tension. As described above, the different values are detected from the two bend sensors according to the bending direction and the controller 130 determines the bending direction according to a detection characteristic of the value.

Although the bending direction is sensed using the two bend sensors in views (a) to (c) of FIG. 6, the bending direction may be determined by means of only a strain gage disposed on one surface or opposite surfaces of the display 110.

Figure 7:
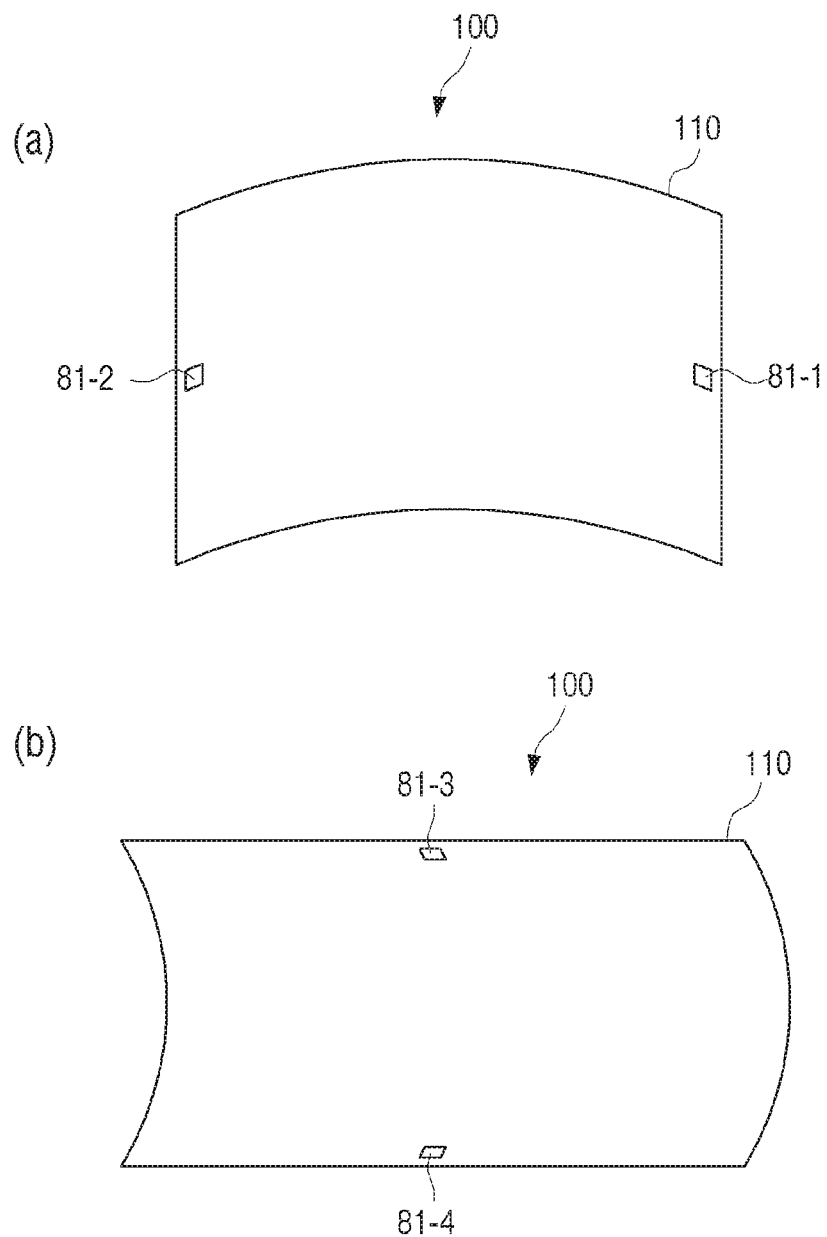
FIG. 7 is a view illustrating a method for sensing a bending direction according to another exemplary embodiment.

FIG. 7 is a view to illustrate a method for sensing a bending direction according to another exemplary embodiment. Specifically, views (a) and (b) of FIG. 7 are views to illustrate a method for sensing a bending direction using an acceleration sensor for example.

The sensor 120 may include a plurality of acceleration sensors disposed on edge areas of the display 110. The controller 130 may determine a bending direction of the display 110 based on a result of sensing by the sensor 120.

The acceleration sensor is a sensor that measures acceleration of a motion and a direction of the acceleration. Specifically, the acceleration sensor outputs a sensing value corresponding to acceleration of gravity which changes according to a slope of an apparatus at which that sensor is attached.

Accordingly, when the acceleration sensors 81-1 and 81-2 are disposed on opposite edges of the display 110, as shown in view (a) of FIG. 7, output values sensed by the acceleration sensors 81-1 and 81-2 are changed when the display 110 is bent. The controller 130 calculates a pitch angle and a roll angle using the output values sensed by the acceleration sensors 81-1 and 81-2. Accordingly, the controller 130 may determine a bending direction based on changes in the pitch angle and the roll angle sensed by the acceleration sensors 81-1 and 81-2.

In view (a) of FIG. 7, the acceleration sensors 81-1 and 81-2 are disposed on opposite edges in the horizontal direction with reference to the front surface of the display 110. However, the acceleration sensors may be disposed in the vertical direction, as shown in view (b) of FIG. 7. In this case, when the display 110 is bent in the vertical direction, the controller 130 may determine a bending direction according to measurement values sensed by the acceleration sensors 81-3 and 81-4 in the vertical direction.

In views (a) and (b) of FIG. 7, the acceleration sensors are disposed on the left and right edges or the upper and lower edges of the display 110. However, the acceleration sensors may be disposed all of the left, right, upper and right edges or may be disposed on corners.

The bending direction may be sensed using a gyro sensor or a geomagnetic sensor, other than the acceleration sensor described above. The gyro sensor refers to a sensor which, when a rotational motion occurs, detects an angular velocity by measuring Coriolis' force exerted in a velocity direction of the motion. Based on a measurement value of the gyro sensor, a direction of the rotational motion can be sensed and thus a bending direction can also be sensed. The geomagnetic sensor refers to a sensor which senses azimuth using a 2-axis or 3-axis fluxgate. When such a geomagnetic sensor is applied, the geomagnetic sensor disposed on each edge of the flexible display apparatus 100 suffers from location movement when the edge is bent, and outputs an electric signal corresponding to a change in geomagnetism caused by the location movement. The controller 130 may calculate a yaw angle using the value output from the geomagnetic sensor. According to a change in the calculated yaw angle, various bending characteristics such as a bending area and a bending direction can be determined.

As described above, the controller 130 may determine bending of the display 110 based on a result of sensing by the sensor 120. The configuration of the sensor and the sensing method described above may be applied to the flexible display apparatus 100 individually or may be applied in combination.

In the above-described exemplary embodiment, the display 110 is bent. However, since the display 110 is bent along with the flexible display apparatus 100, sensing bending of the display 110 may be regarded as sensing bending of the flexible display apparatus 100. That is, the configuration to sense bending may be provided in the flexible display apparatus 100, and the controller 130 may determine bending of the flexible display apparatus 100 based on a result of sensing.

The sensor 120 may sense a user's touch manipulation on a screen of the display 110. In this case, the sensor 120 may include a resistive or capacitive touch sensor, and the controller 130 may determine coordinates of a point of the display 110 at which the user touches based on an electric signal transmitted from the sensor 120.

The controller 130 controls an overall operation of the flexible display apparatus 100. In particular, the controller 130 may determine bending of the display 110 based on a result of sensing by the sensor 120. Specifically, the controller 130 may determine bending/unbending of the display 110, a location of a bending area, a size of a bending area, a number of bending areas, a size of a bending line, a location of a bending line, a number of bending lines, a bending direction, a bending angle, and a number of times that bending occurs, using a resistance value output from a bend sensor or a strain gage. This has been described above with reference to FIGS. 3 to 7 and a redundant explanation thereof is omitted.

The display 110 may display an object at a predetermined location of the screen. The predetermined location at which the object is displayed may be set at the time of manufacturing the flexible display apparatus 100, and may be set and changed by the user. For example, the user may set and change the location of the object displayed on the screen through a separate button (for example, an object location adjusting button) or a separate menu displayed on the flexible display apparatus 100.

Accordingly, the display 110 may display an object on a first location of the screen. The object recited herein is a graphic element that consists of various shapes, such as a circle or polygon, and a shape, a size, and a display location of the object may be set and changed by the user.

The controller 130 may move the location of the object based on the location on the screen at which bending is sensed while the bending is maintained.

Specifically, the controller 130 may move the object to a relatively lower location with reference to a Z-axis by considering an area at which bending is performed on the screen and a bending direction. The area at which bending is performed may be an area of a predetermined size including a bending line.

At this time, the controller 130 may determine a moving direction of the object by considering the bending line. That is, the controller 130 may move the object to a relatively lower location with reference to the Z-axis along a line perpendicular to the bending line.

A detailed description will be provided with reference to FIGS. 8 to 12.

Figure 8:
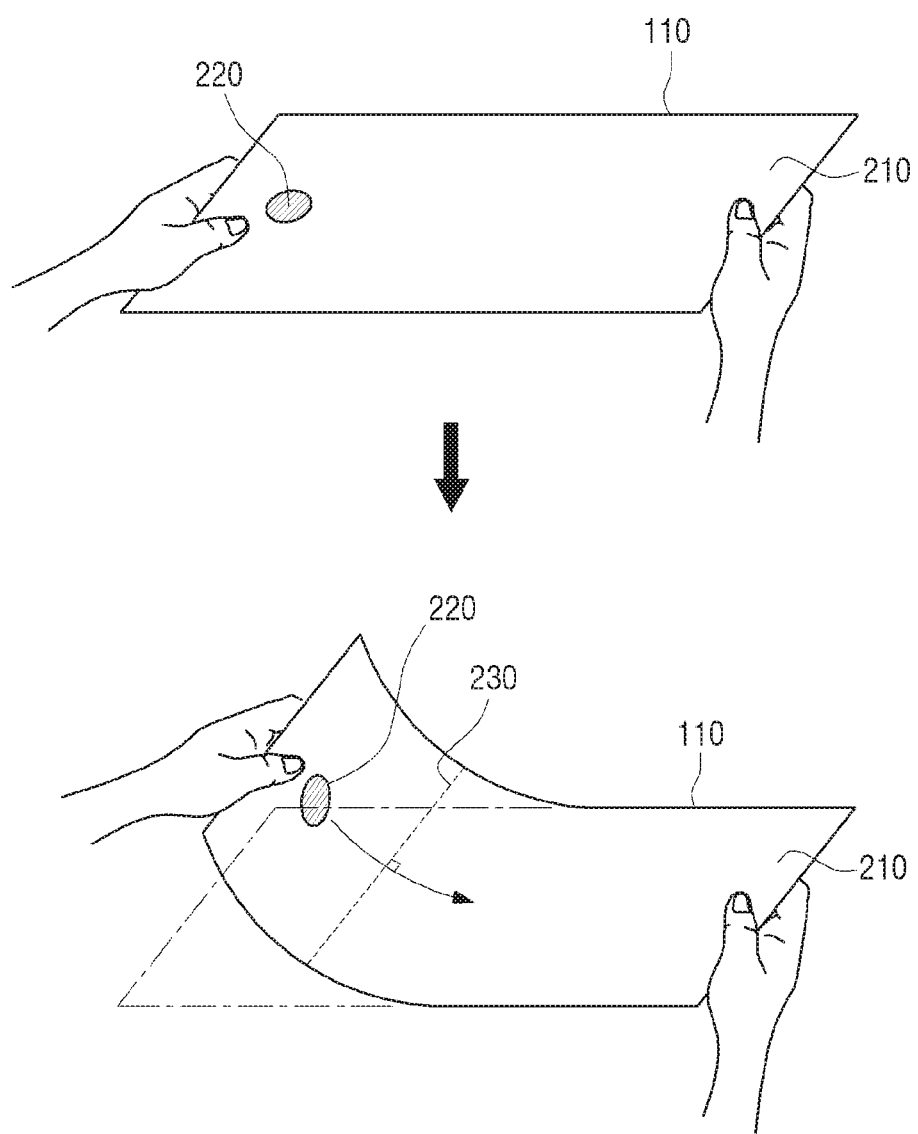
FIGS. 8 to 10 are views illustrating an example of a method for moving an object on a screen based on bending of the flexible display apparatus according to an exemplary embodiment.
Figure 9:
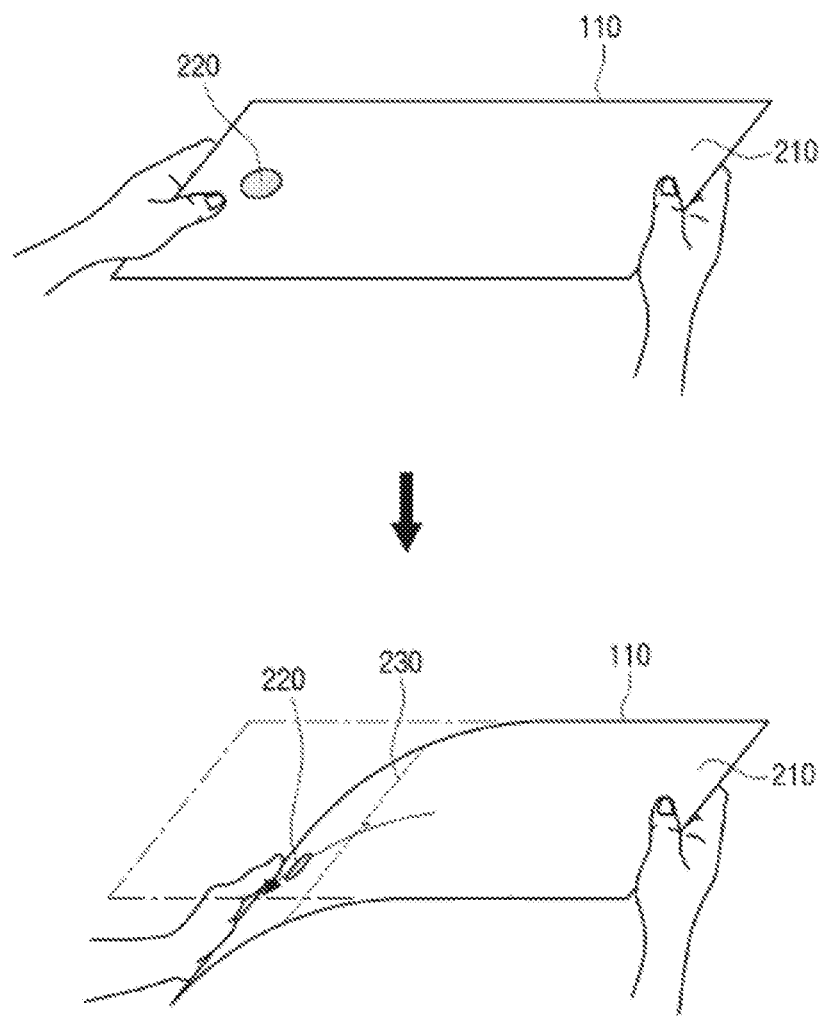
Figure 10:
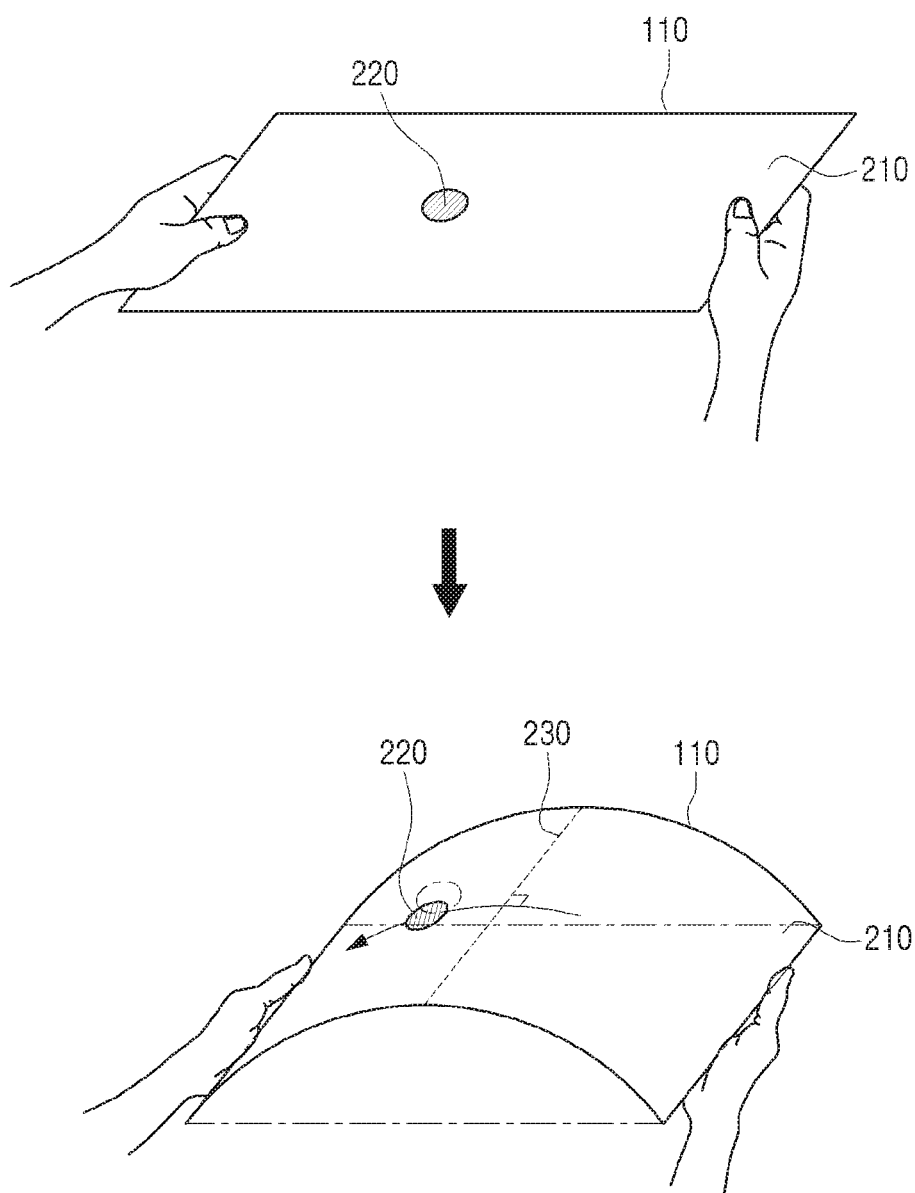

FIGS. 8 to 10 are views to illustrate an example of a method for moving an object on the screen based on bending of the flexible display apparatus according to an exemplary embodiment.

As shown in FIG. 8, it is assumed that a left of the display 110 is bent in the Z+ direction and an object 220 is displayed on a left of the bending area on a screen 210. In this case, the controller 130 may move the object to a relatively lower location with reference to the Z-axis, that is, to the bending area with reference to the object. Accordingly, the object 220 may be moved to the right of the display 110. At this time, the object 220 may be moved to the right of the display 110 along a line perpendicular to a bending line 230.

Although not shown in FIG. 8, it is assumed that the left of the display 110 is bent in the Z+ direction and the object 220 is displayed on a right of the bending area on the screen 210. In this case, the controller 130 may move the object to a relatively lower location with reference to the Z-axis, that is, to an area opposite the bending area with reference to the object. Accordingly, the object 220 may be moved to the right of the display 110. At this time, the object 220 may be moved to the right of the display 110 along the line perpendicular to the bending line 230.

Also, it is assumed that a right of the display 110 is bent in the Z+ direction and the object 220 is displayed on a right of the bending area on the screen 210. In this case, the controller 130 may move the object to a relatively lower location with reference to the Z− axis, that is, to the bending area with reference to the object. Accordingly, the object 220 may be moved to the left of the display 110. At this time, the object 220 may be moved to the left of the display 110 along the line perpendicular to the bending line 230.

Also, it is assumed that the right of the display 110 is bent in the Z+ direction and the object 220 is displayed on a left of the bending area on the screen 210. In this case, the controller 130 may move the object to a relatively lower location with reference to the Z− axis, that is, to an area opposite the bending area with reference to the object. Accordingly, the object 220 may be moved to the left of the display 110. At this time, the object 220 may be moved to the left of the display 110 along the line perpendicular to the bending line 230.

On the other hand, as shown in FIG. 9, it is assumed that the left of the display 110 is bent in the Z− direction and the object 220 is displayed on the left of the bending area on the screen 210. In this case, the controller 130 may move the object to a relatively lower location with reference to the Z-axis, that is, to an area opposite the bending area with reference to the object. Accordingly, the object 220 may be moved to the left of the display 110. At this time, the object 220 may be moved to the left of the display 110 along the line perpendicular to the bending line 230.

Although not shown in FIG. 9, it is assumed that the left of the display 110 is bent in the Z− direction and the object 220 is displayed on the right of the bending area on the screen 210. In this case, the controller 130 may move the object to a relatively lower location with reference to the Z-axis, that is, to the bending area with reference to the object. Accordingly, the object 220 may be moved to the left of the display 110. At this time, the object 220 may be moved to the left of the display 110 along the line perpendicular to the bending line 230.

Also, it is assumed that the right of the display 110 is bent in the Z− direction and the object 220 is displayed on the right of the bending area on the screen 210. In this case, the controller 130 may move the object to a relatively lower location with reference to the Z− axis, that is, to an area which is opposite the bending area with reference to the object. Accordingly, the object 220 may be moved to the right of the display 110. At this time, the object 220 may be moved to the right of the display 110 along the line perpendicular to the bending line 230.

Also, it is assumed that the right of the display 110 is bent in the Z− direction and the object 220 is displayed on the left of the bending area on the screen 210. In this case, the controller 130 may move the object to a relatively lower location with reference to the Z− axis, that is, to the bending area with reference to the object. Accordingly, the object 220 may be moved to the right of the display 110. At this time, the object 220 may be moved to the right of the display 110 along the line perpendicular to the bending line 230.

On the other hand, as shown in FIG. 10, it is assumed that a center of the display 110 is bent in the Z+ direction and the object 220 is displayed on the left of the bending area on the screen 210. In this case, the controller 130 may move the object to a relatively lower location with reference to the Z-axis, that is, to an area which is opposite the bending area with reference to the object. Accordingly, the object 220 may be moved to the left of the display 110. At this time, the object 220 may be moved to the left of the display 110 along the line perpendicular to the bending line 230.

Although not shown in FIG. 10, it is assumed that the center of the display 110 is bent in the Z+ direction and the object 220 is displayed on the right of the bending area on the screen 210. In this case, the controller 130 may move the object to a relatively lower location with reference to the Z-axis, that is, to an area which is opposite the bending area with reference to the object. Accordingly, the object 220 may be moved to the right of the display 110. At this time, the object 220 may be moved to the right of the display 110 along the line perpendicular to the bending line 230.

Also, it is assumed that the center of the display 110 is bent in the Z− direction and the object 220 is displayed on the left of the bending area on the screen 210. In this case, the controller 130 may move the object to a relatively lower location with reference to the Z− axis, that is, to the bending area with reference to the object. Accordingly, the object 220 may be moved to the right of the display 110. At this time, the object 220 may be moved to the right of the display 110 along the line perpendicular to the bending line 230.

Also, it is assumed that the center of the display 110 is bent in the Z− direction and the object 220 is displayed on the right of the bending area on the screen 210. In this case, the controller 130 may move the object to a relatively lower location with reference to the Z− axis, that is, to the bending area with reference to the object. Accordingly, the object 220 may be moved to the left of the display 110. At this time, the object 220 may be moved to the left of the display 110 along the line perpendicular to the bending line 230.

In the above-described exemplary embodiment, the object is moved to the right or left of the display 110. However, this is because the left or right of the display 110 is bent. The object may be moved in various directions according to a bending area and a bending direction.

For example, it is assumed that a left lower end of the display 110 is bent in the Z+ direction and the object 220 is displayed on a left of the bending area on the screen 210. In this case, the controller 130 may move the object to a relatively lower location with reference to the Z-axis, that is, to the bending area with reference to the object. Accordingly, the object 220 may be moved to a right upper end of the display 110. At this time, the object 220 may be moved to the right upper end of the display 110 along the line perpendicular to the bending line 230.

In addition, the object may be moved in various directions, such as a right lower end direction, a left upper end direction, or a left lower end direction of the display 110 according to a bending area and a bending direction.

When a bending state of the display 110 is changed while the object is moved according to the bending state of the display 110, the controller 130 may change a moving direction of the object to correspond to the changed bending state. The bending state may include a location of a bending area and a bending direction.

That is, the controller 130 may determine a direction in which the moving object is located with reference to a changed location of the bending area, and may determine a moving direction of the object by considering a relative location of the moving object and a bending direction. A detailed explanation will be provided with reference to FIGS. 11 and 12.

Figure 11:
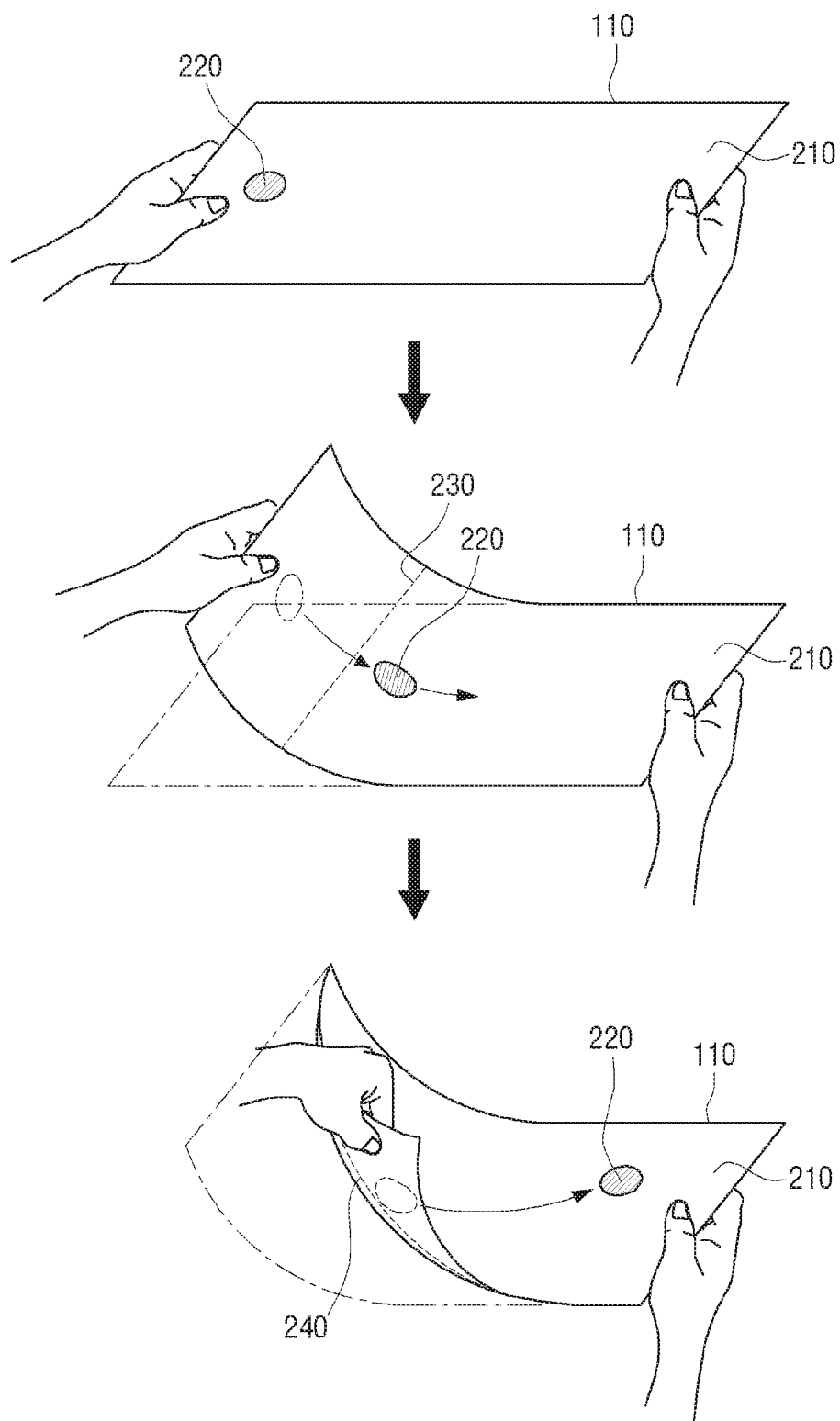
FIGS. 11 and 12 are views illustrating an example of a method for changing a moving direction of an object according to a bending state of a flexible display apparatus according to an exemplary embodiment.
Figure 12:
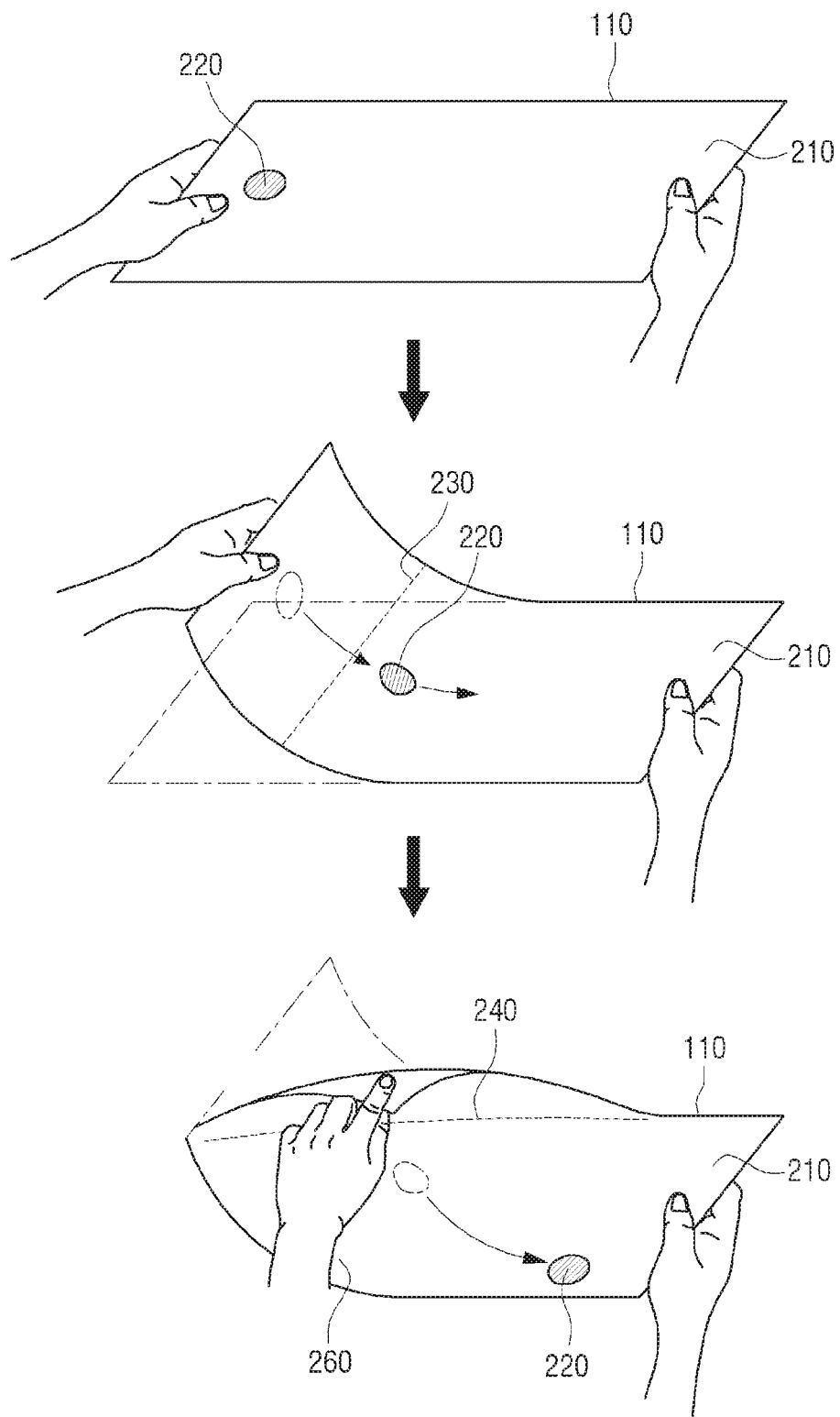

FIGS. 11 and 12 are views to illustrate an example of a method for changing a moving direction of an object according to a bending state of the display according to an exemplary embodiment.

As shown in FIG. 11, it is assumed that the left of the display 110 is bent in the Z+ direction and the object 220 is displayed on the left of the bending area on the screen 210, and the object 220 is moved to the right of the display 110 along the line perpendicular to the bending line 230.

At this time, when the left lower end of the display 110 is bent in the Z+ direction and a location of the bending area is changed, the controller 130 may change a moving direction of the object 220 according to the changed location of the bending area. That is, since the moving object 220 is located on the right of the changed bending area, the controller 130 may move the object 220 in the opposite direction of the bending area. Accordingly, the object 220 may be moved to the right upper end of the display 110 along a line which to a changed bending line 240.

Also, when the left upper end of the display 110 is bent in the Z+ direction and the location of the bending area is changed as shown in FIG. 12, the controller 130 may move the moving object 220 in the opposite direction of the bending area since the object 220 is located on the right of the changed bending area. Accordingly, the object 220 may be moved to the right lower end of the display 110 along a line perpendicular to the changed bending line 240.

In the above-described exemplary embodiment, the left lower end or the left upper end of the display 110 is bent after the left of the display 110 is bent. However, this is merely an example for explaining the moving direction of the object being changed. That is, the controller 130 may change the moving direction of the object based on a location of a newly bent area of the display 110.

For example, it is assumed that the right of the display 110 is bent in the Z+ direction and the object 220 is displayed on the left of the bending area on the screen 210, and the object 220 is moved to the left of the display 110 along the line perpendicular to the bending line 230. At this time, when the right lower end of the display 110 is bent in the Z+ direction and the location of the bending area is changed, the controller 130 may move the object 220 to the left upper end of the display 110 along the line perpendicular to the changed bending line 240. Also, when the right upper end of the display 110 is bent in the Z+ direction and the location of the bending area is changed, the controller 130 may move the object 220 to the left lower end of the display 110 along the line perpendicular to the changed bending line 240.

Also, although not shown, the controller 130 may change the moving direction of the object even when a bending direction is changed while the object is being moved.

For example, it is assumed that the left of the display 110 is bent in the Z+ direction and the object 220 is displayed on the left of the bending area on the screen 210, and the object 220 is moved to the right of the display 110 along the line perpendicular to the bending line 230.

At this time, when the left of the display 110 is bent in the Z− direction, the controller 130 may change the moving direction of the object based on the changed bending direction. Specifically, when the moving object is located on the right of the bending area, the controller 130 may move the object to the bending area with reference to the object. That is, the controller 130 may move the object to the left of the display 110 along a line perpendicular to the changed bending line 240.

Although the object is moved along the line perpendicular to the bending line in the above-described exemplary embodiment, this is merely an example. The direction in which the object is moved may be variously set. For example, the controller 130 may move the object along a line which forms an angle of 80°, 70°, 60°, . . . with the bending line.

On the other hand, the controller 130 may move the object while bending is held on the display 110 and may stop moving the object when the display 110 is in a flat state. In this case, the controller 130 may adjust a moving distance of the object to be proportional to a bending holding time. A detailed description of this will be provided with reference to FIG. 13.

Figure 13:
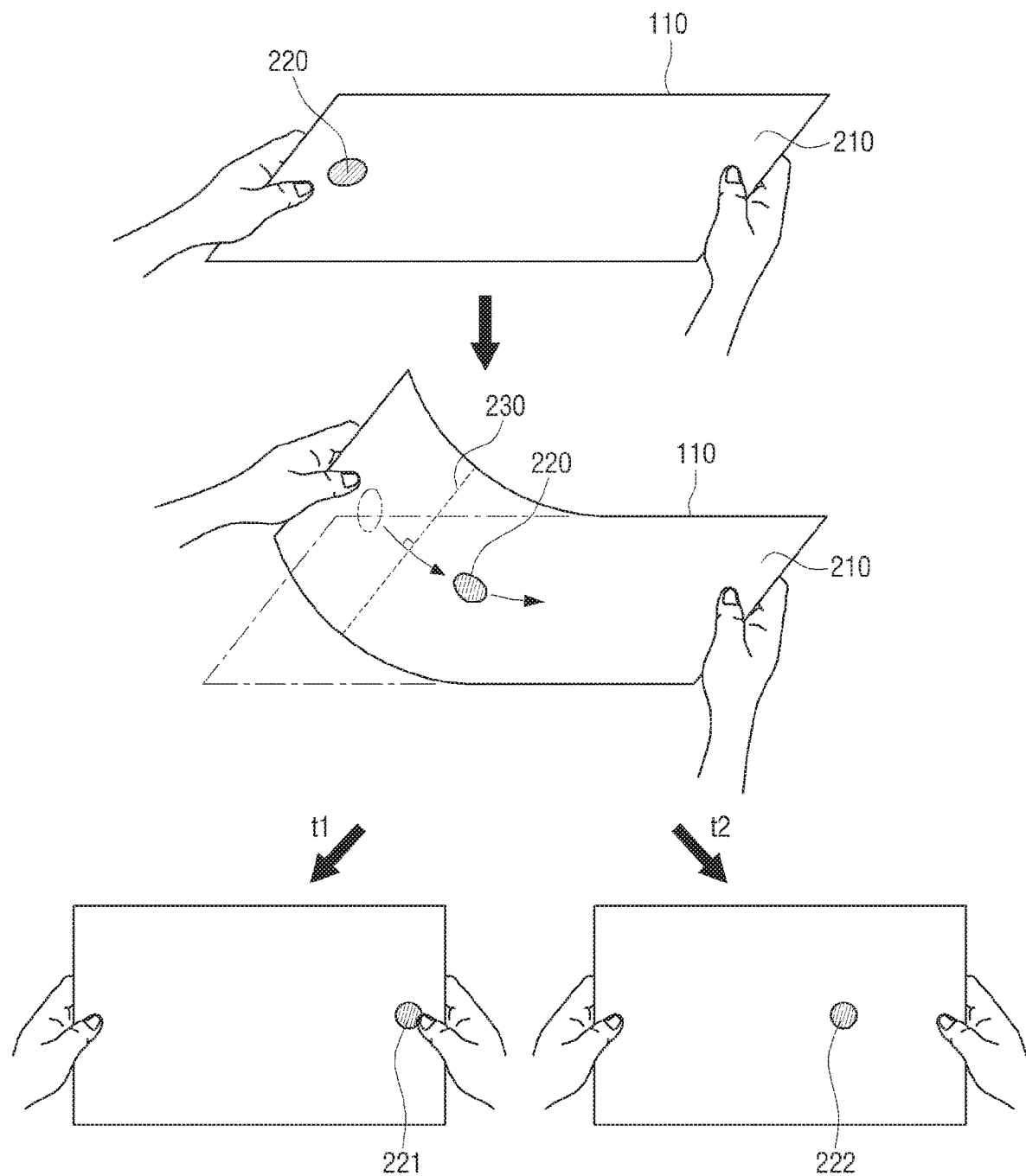
FIG. 13 is a view illustrating object movement based on a deformation duration according to an exemplary embodiment.

FIG. 13 is a view to illustrate object movement based on a deformation duration according to an exemplary embodiment.

As shown in FIG. 13, it is assumed that the left of the display 110 is bent in the Z+ direction and the object 220 is displayed on the left of the bending area on the screen 210, and the object 220 is moved to the right of the display 110 along the line perpendicular to the bending line 230.

At this time, as a bending holding time increases, the controller 130 moves the object 220 further. That is, when a bending holding time $t_1$ is longer than a bending holding time t2, the object 221, which is moved when the bending is held for time $t_1$, is moved further than the object 222, which is moved when bending is held for time t2. Accordingly, as the duration of the deformation increases, the distance of the object movement correspondingly increases.

On the other hand, the controller 130 may adjust a distance of the object movement according to a degree of bending of the display 110. Specifically, the controller 130 may adjust a distance of the object movement to be proportional to a degree of bending. A detailed description of this will be provided with reference to FIG. 14.

Figure 14:
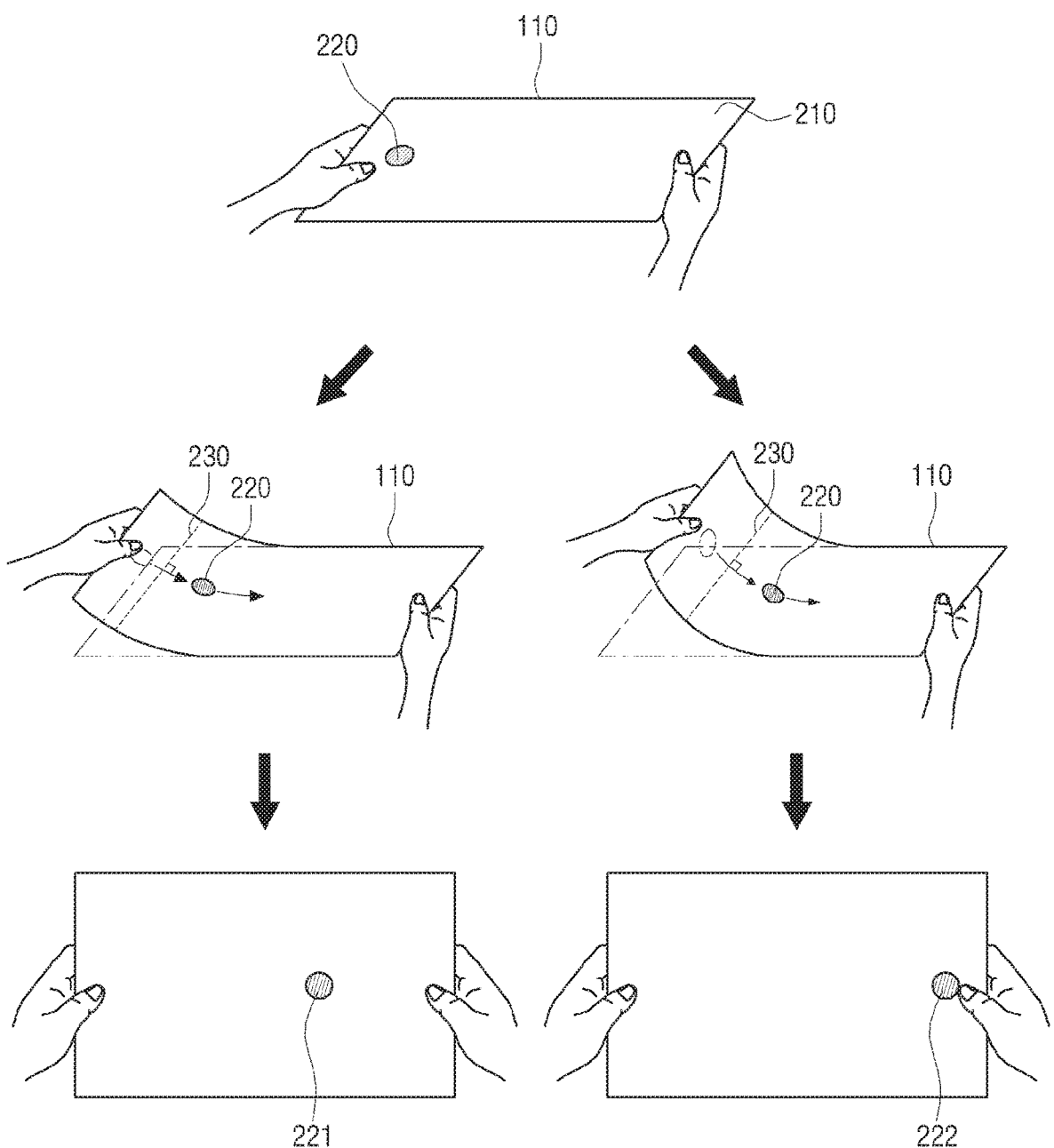
FIG. 14 is a view illustrating a distance of object movement based on a degree of bending according to an exemplary embodiment.

FIG. 14 is a view to illustrate a distance of object movement based on a degree of bending according to an exemplary embodiment.

As shown in FIG. 14, it is assumed that the left of the display 110 is bent in the Z+ direction and the object 220 is displayed on the left of the bending area on the screen 210, and the object 220 is moved to the right of the display 110 along the line perpendicular to the bending line 230.

At this time, as a degree of bending increases, the controller 130 may move the object 220 further. That is, with the assumption that bending is held for the same time, the object 222 is moved further in accordance with a relatively high degree of bending and the object 221 is moved less in accordance with a relatively lower degree of bending.

In the above-described exemplary embodiments, the moving distance of the object is changed according to the duration of the bending and the degree of bending. However, this is merely an example.

For example, the controller 130 may control a moving speed of the object according to a bending duration. Specifically, the controller 130 may control the moving speed of the object to be proportional to the bending duration. That is, as the bending duration increases, the controller 130 may accelerate the object.

For another example, the controller 130 may control a moving speed of the object according to a degree of bending. Specifically, the controller 130 may adjust the moving speed of the object to be proportional to the degree of bending. That is, as the degree of bending increases, the controller 130 may accelerate the object.

On the other hand, the controller 130 may control a moving speed of the object according to a length of the bending line. Specifically, the controller 130 may control the moving speed of the object to be proportional to the length of the bending line. For example, when the bending line intersects with two adjacent sides of the display 110, as the length of the bending line increases, the controller 130 may increase the object speed.

Also, the controller 130 may determine a bending area and a bending direction based on a result of sensing by the sensor 120.

For example, the controller 130 may determine an area including a point at which a bend sensor outputs a resistance value different from that of the original state as a bending area, and may determine a line connecting points of the bending area that output the greatest resistance value as a bending line. The controller 130 may determine a bending direction of the display 110 based on resistance values of bend sensors disposed in opposite surfaces of the display 110.

Also, the controller 130 may determine a degree of bending and a bending holding time based on a result of sensing by the sensor 120.

For example, the controller 130 may determine a degree of bending using resistance values output from bend sensors disposed along a bending line when the display 110 is bent. The controller 130 may determine a bending holding time using a time during which the bend sensor outputs a resistance value different from that of the original state.

However, this is merely an example and the controller 130 may determine a bending area, a bending direction, a degree of bending, and a bending duration using various methods described with reference to FIGS. 3 to 7.

The controller 130 may control a movement of the object by combining results of sensing by the bend sensor, the gravity sensor, or the acceleration sensor.

Specifically, when it is determined that a gravity direction sensed by the gravity sensor disposed along an edge of the display 110 is changed, the controller 130 may determine a bending direction of display 110 based on the changed gravity direction. Also, the controller 130 may determine a bending direction of the display 110 based on a change in acceleration sensed by the acceleration sensor which is disposed along the edge of the display 110. The controller 130 may determine a bending area based on a resistance value sensed by the bend sensor, and may move the object according to a result of the determining.

When a movement of the display 110 is not sensed, the controller 130 may determine a bending state of the display 110 with reference to a result of sensing by the gravity sensor or the acceleration sensor, and, when a movement of the display 110 is sensed, the controller 130 may determine a bending state of the display 110 using only a result of sensing by the bend sensor. By doing so, a value sensed by the gravity sensor or the acceleration sensor when the flexible display apparatus 100 is rotated or tilted is prevented from being misrecognized as a value sensed when the display 110 is bent.

The controller 130 may control execution of a function corresponding to a movement of an object. That is, the controller 130 may determine a moving direction, a moving distance, and a moving speed of an object displayed on the screen, based on at least one of a location of the object on the screen, a bending area on the screen, a bending direction, a degree of bending, and a bending duration, and may move the object according to a result of the determining and display the object.

Accordingly, when the object is moved to a predetermined second location, the controller 130 may execute a function mapped to the second location.

For example, when a screen displayed on the display 110 is a lock screen and an object on the lock screen is moved to a predetermined second location corresponding to an unlock function in response to the bending, the controller 130 may unlock the lock screen.

Specifically, when there is no user input to the flexible display apparatus 100 for a predetermined time, the controller 130 may enter a screen off mode and turns off the screen of the display 110. The controller 130 determines whether a user manipulation is input, and, when it is determined that the user manipulation is input, the controller 130 enters a screen lock mode and displays the lock screen on the display 110. The user manipulation recited herein may include pressing a specific button provided on the flexible display apparatus 100 or a touch manipulation on the display 110.

An object may be displayed on the lock screen, and, when the object is moved to an unlocking menu in accordance with the bending of the display 110, the controller 130 unlocks the lock screen and enters a screen activation mode. That is, when the lock screen is unlocked, the controller 130 may display a main screen on the display 110, and, when one menu is selected on the main screen, the controller 130 may execute a function corresponding to the selected menu and may display an execution resulting screen on the display 110. The main screen may be a screen that includes at least one of an icon, a widget, and an image of an application installed in the flexible display apparatus 100.

Figure 15:
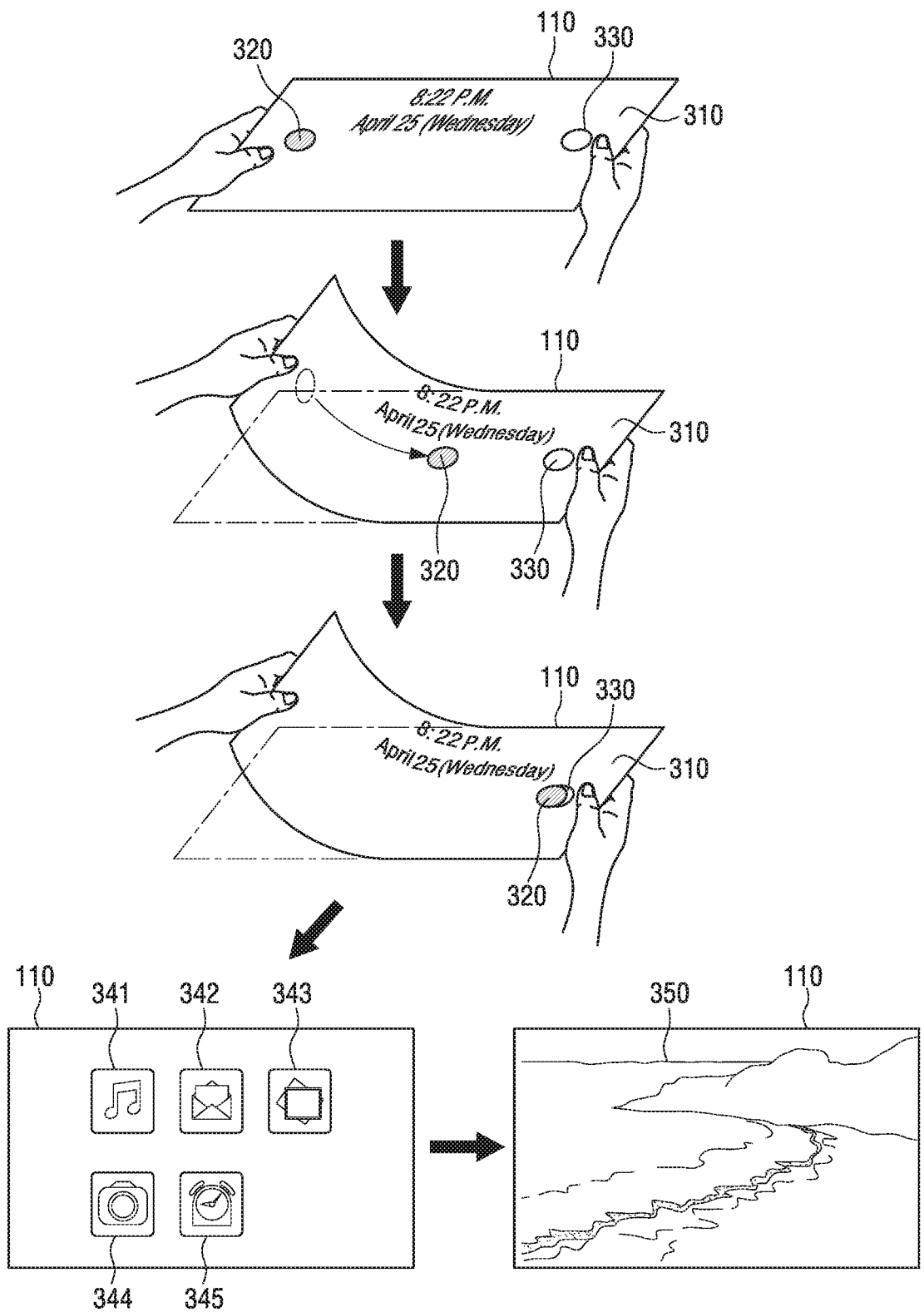
FIG. 15 is a view illustrating an example of a method for unlocking a lock screen according to an exemplary embodiment.

FIG. 15 is a view to illustrate an example of a method for unlocking a lock screen according to an exemplary embodiment.

As shown in FIG. 15, an object 320 which is movable according to bending of the display 110 is displayed on a lock screen 310. Also, a current time and a current date are displayed along with the object 320 on the lock screen 310 of FIG. 15. However, this is merely an example. That is, a widget and an image may be displayed along with the object 320 according to user setting. Also, only an object that is movable according to a bending direction may be displayed on the lock screen.

When the left of the display 110 on which the object 320 is displayed is bent in the Z+ direction, the object 320 is moved to the right of the display 110. However, a unlocking menu 330 is not moved even when the display 110 is bent.

Accordingly, when the object 320 is moved to the position of the unlocking menu 330, the lock screen is unlocked and a main screen 340 including a plurality of icons 341 to 345 is displayed on the display 110. When the object 320 overlaps the position of the unlocking menu 330 in whole or in part, the main screen 340 may be displayed. The position of the unlocking menu 330 may be indicated by an icon, object, or image displayed on the display.

When one icon 344 is selected from among the plurality of icons 341 to 345, an application corresponding to the selected icon 344 may be executed and an application execution screen may be displayed on the display 110. For example, when the icon 344 for a photo application is selected, the photo application may be executed and thus an image 350 stored in the flexible display apparatus 100 may be displayed on the display 110.

Also, when the object on the lock screen is moved to a predetermined second location, the controller 130 may unlock the lock screen and may automatically perform an additional operation which is also mapped to the second location. The operation performed when the object is moved to the second location may be a function of executing an application installed in the flexible display apparatus 100 and displaying an execution resulting screen on the display 110. This may be set and changed by the user.

Figure 16:
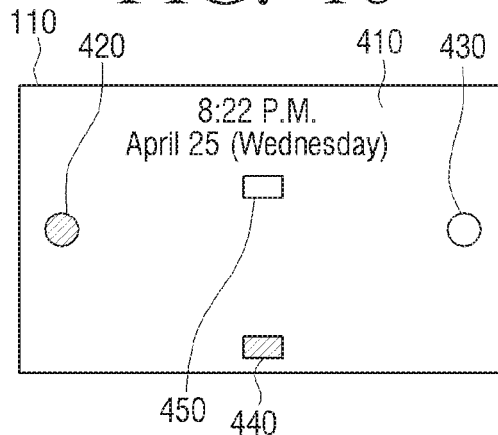
FIGS. 16 and 17 are views illustrating examples of a method for performing an operation mapped to a location of an object according to an exemplary embodiment.
Figure 16:
Figure 16:
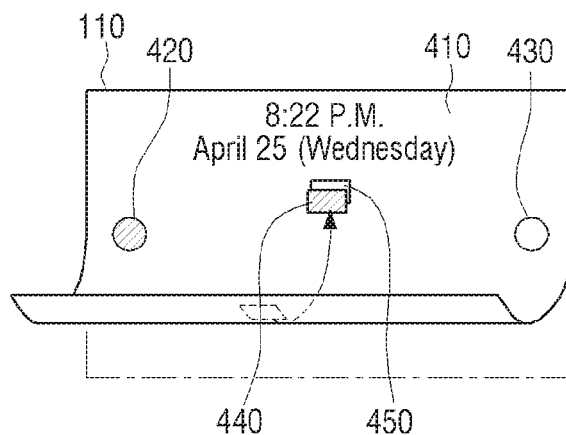
Figure 16:
Figure 17:
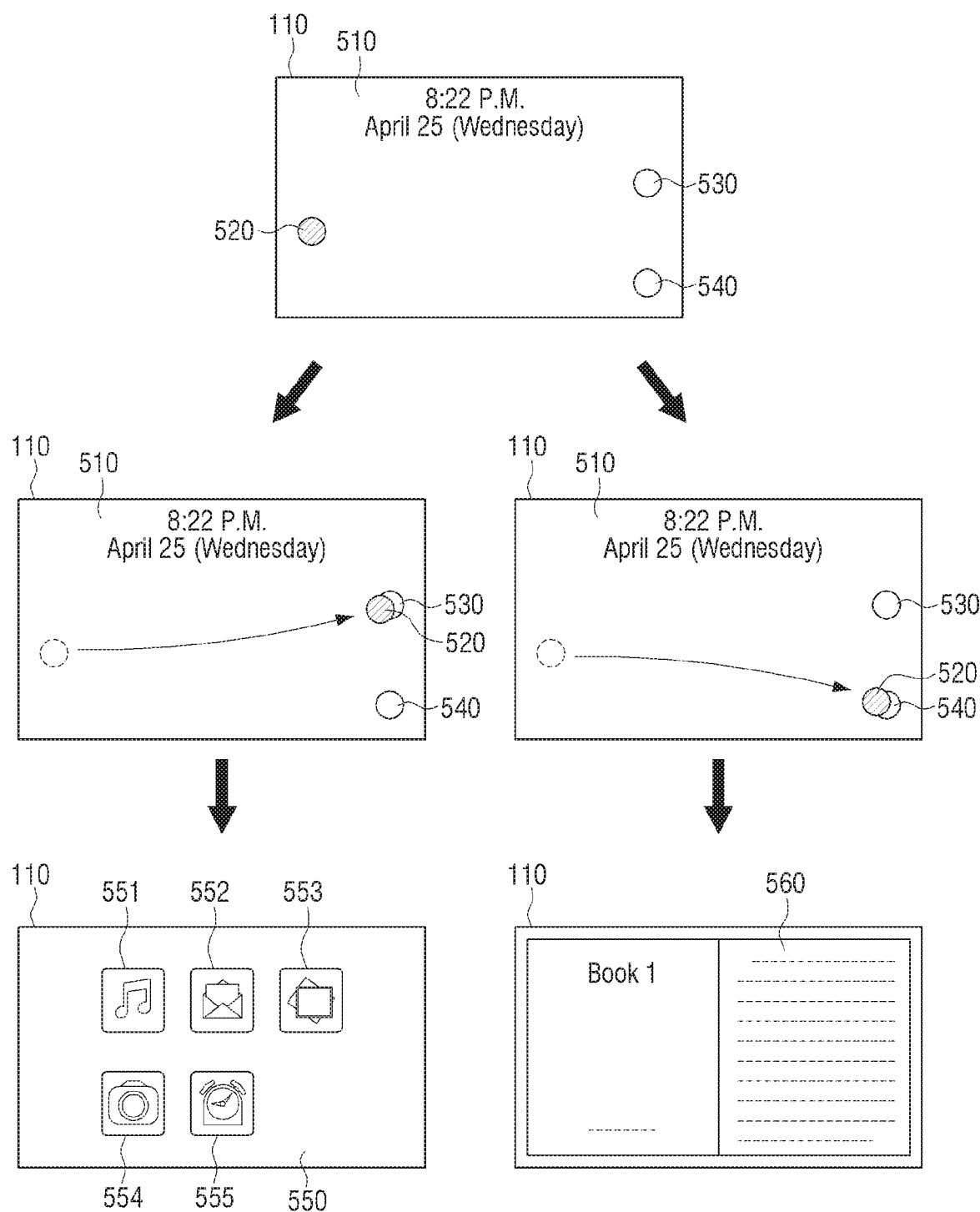

FIGS. 16 and 17 are views to illustrate examples of a method for performing an operation mapped to a location of an object according to an exemplary embodiment.

For example, objects 420 and 440 may be displayed on different locations of a lock screen 410 as shown in FIG. 16, and the objects 420 and 440 are movable according to bending of the display 110.

Specifically, when the left of the display 110 is bent in the Z+ direction and the object 420 displayed on the left of the lock screen 420 is moved to a unlocking menu 430, the lock screen may be unlocked and a main screen may be displayed on the display 110. This has been described above with reference to FIG. 15 and thus a redundant explanation is omitted.

The object 440 displayed on the lower side of the lock screen 410 is a menu for automatically executing a predetermined operation at the same time as unlocking the lock screen. That is, when the lower side of the display 110 is bent in the Z+ direction, the object 440 is moved to the upper side of the display 110. At this time, a function execution menu 450 is not moved even when the display 110 is bent.

Accordingly, when the object 440 is moved to the position of the function execution menu 450, the lock screen may be unlocked and a predetermined function mapped onto the function execution menu 450 may be performed. That is, the predetermined function mapped onto the function execution menu 450 may be automatically performed without displaying a main screen, and a screen on which the predetermined function is performed may be displayed on the display 110. For example, when the object 440 is moved to the position of the function execution menu 450 as shown in FIG. 16, the lock screen may be unlocked, a calendar application may be automatically executed, and a calendar 460 may be displayed on the display 110.

In the above-described exemplary embodiment, the object for unlocking the lock screen and performing a specific function is displayed separately from the object for unlocking the lock screen only. However, this is merely an example.

That is, only one object may be displayed on the lock screen, and, when the object is moved to a location of the function execution menu according to bending of the display 110, a specific function may be automatically performed. Also, by moving one object, the operation of unlocking the lock screen and automatically executing a specific function at the same time may be performed.

That is, as shown in FIG. 17, one object may be displayed on a lock screen, and a main screen may be displayed or a specific operation may be automatically performed according to an area to which the object is moved according to a bending state of the display 110.

Referring to FIG. 17, an object 520, which is movable according to bending of the display 110, is displayed on a lock screen 510. A unlocking menu 530 and a function execution menu 540 are displayed along with the object 520 on the lock screen 510, and an operation may be performed according to a location to which the object 520 is moved.

That is, when the object 520 is moved to the unlocking menu 530 according to a bending state of the display 110, a main screen 550 including a plurality of icons 551 to 555 may be displayed on the display 110. On the other hand, when the object 520 is moved to the function execution menu 540 according to a bending state of the display 110, an e-book application mapped onto the function execution menu 540 may be executed and an e-book screen 560 may be displayed on the display 110.

Figure 18:
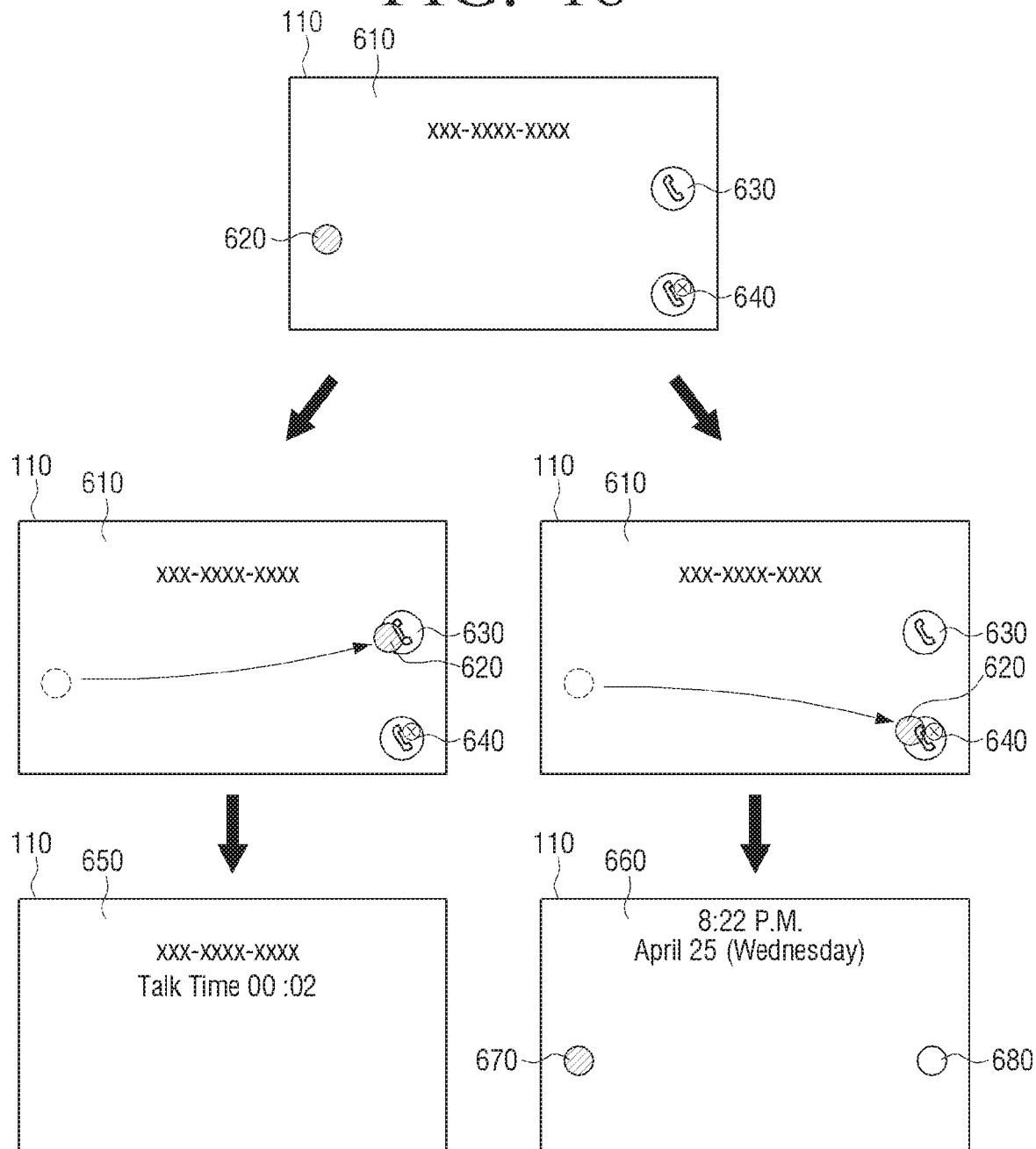
FIG. 18 is a view illustrating an example of a method for performing an operation mapped to a location of an object according to an exemplary embodiment.

FIG. 18 is a view to illustrate an example of a method for performing an operation mapped to a location of an object according to an exemplary embodiment.

When a call request is received, the controller 130 may control the display 110 to display a call connection screen. When an object on the call connection screen is moved to a location at which a call connection menu is displayed, in accordance with bending, the controller 130 may perform a call connection operation accepting the incoming call request, and, when the object is moved to a location where a call rejection menu is displayed, the controller 130 may perform a call rejection operation rejecting the incoming call request. The call connection screen may include the object, the call connection menu, and the call rejection menu.

That is, when a call request is received from an external apparatus, a call connection screen 610 including an object 620, a call connection menu 630, and a call rejection menu 640 may be displayed on the display 110 as shown in FIG. 18. The object 620 is movable according to a bending state of the display 110, but the call connection menu 630 and the call rejection menu 640 are not moved when the display 110 is bent.

When the object 620 is moved to the call connection menu 630 according to a bending state of the display 110, a call screen 650 is displayed on the display 110 and a call connection operation of exchanging voices with an external apparatus is performed.

On the other hand, when the object 620 is moved to the call rejection menu 640 according to a bending state of the display 110, the controller 130 rejects the call request of the external apparatus and displays a prior screen before the call connection screen is displayed on the display 110. For example, when the call request is received in a lock state, a lock screen 660 including an object 670 and a unlocking menu 680 may be displayed on the display 110 as shown in FIG. 18.

The flexible display apparatus 100 may further include a communicator (not shown) to connect to an external apparatus through a mobile communication network or the Internet. Also, when a voice obtaining means such as a microphone (not shown) provided in the flexible display apparatus 100 collects a voice or an external sound, and transmits the voice or sound to the controller 130, the controller 130 may signal process the collected voice or external sound and may transmit the voice or external sound to the external apparatus through the communicator (not shown). When a voice signal is received from an external apparatus, the controller 130 may signal process the received voice signal and may output the voice signal through a voice outputting means, such as a speaker.

Various operations may be performed according to a movement of the object in the above-described exemplary embodiment. That is, various operations executable by various applications installed in the flexible display apparatus 100, such as a call connection operation, a call rejection operation, a message display operation, and a web browser connection operation, may be performed, and these operations may be set and changed by the user. The operations may be operations associated with applications executed by the flexible display apparatus 100 or functions of the flexible display apparatus, such as the unlock operation.

For example, it is assumed that a message is received from an external apparatus. After that, when a lock screen including an object and a function execution menu is displayed and the object is moved to the function execution menu by bending the display 110, the controller 130 may execute a message application and may display the message received from the external apparatus on the display 110.

Also, in the above-described exemplary embodiment, the object, the unlocking menu, and the function execution menu are displayed on the lock screen. However, this is merely an example. That is, the controller 130 may display an object on a currently displayed screen according to a user manipulation. A detailed explanation of this will be provided with reference to FIGS. 19 to 21.

Figure 19:
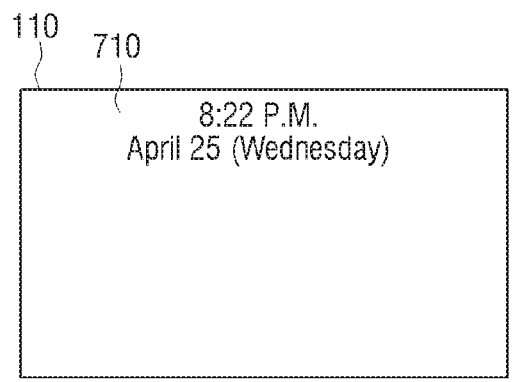
FIGS. 19 to 21 are views illustrating a method for displaying an object on various screens according to an exemplary embodiment.
Figure 19:
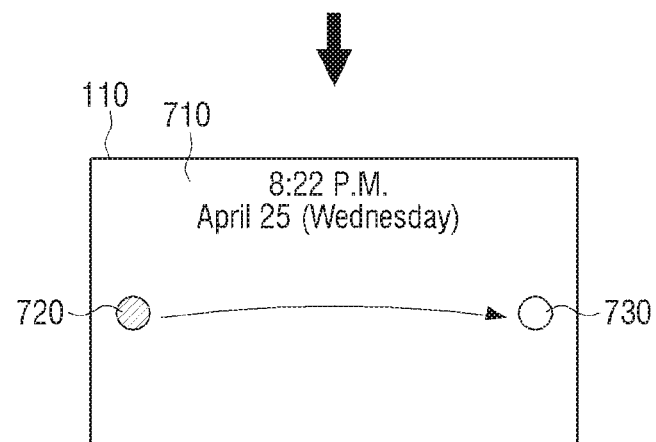
Figure 19:
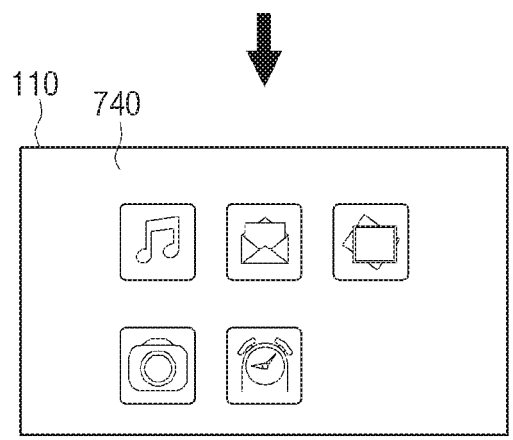
Figure 20:
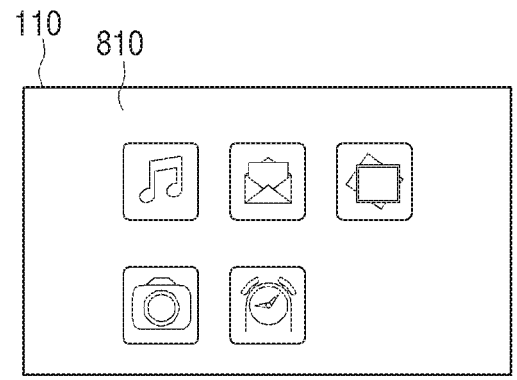
Figure 20:
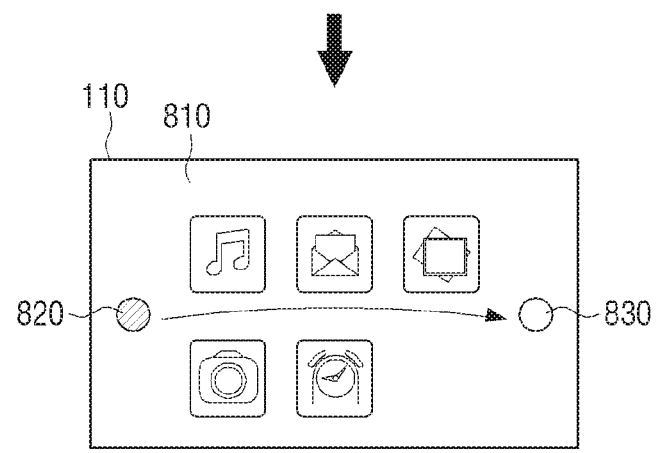
Figure 20:
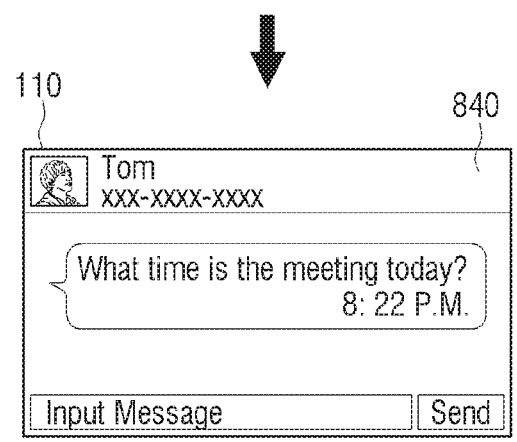
Figure 21:
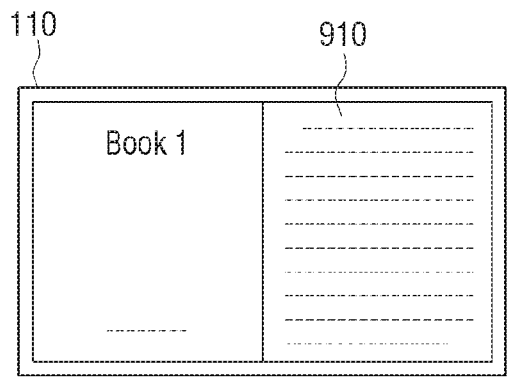
Figure 21:
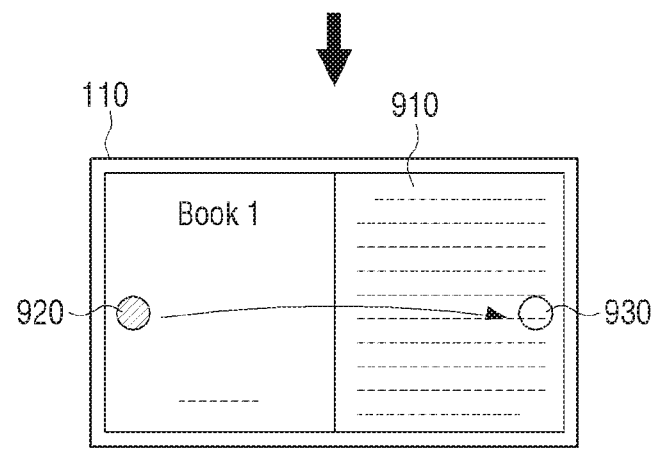
Figure 21:
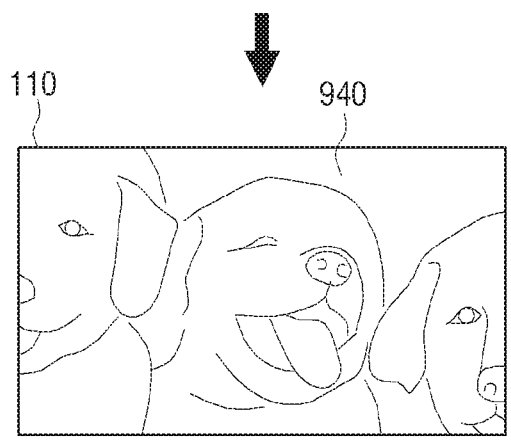

FIGS. 19 to 21 are views to illustrate a method for displaying an object on various screens according to an exemplary embodiment.

The controller 130 may display an object on a first location of the screen when a predetermined user manipulation is input. The user manipulation recited herein may include pressing a specific button provided on the flexible display apparatus 100 and a touch manipulation on the display 110. When the specific button provided on the flexible display apparatus 100 is pressed or the touch manipulation on the display 110 is input, the controller 130 may directly display the object on the screen. However, the controller 130 may display a user interface (UI) on the screen to ask the user whether the user wants to display the object, and may receive a separate user command to display the object through the UI.

When displaying the object, the controller 130 may display a unlocking menu or a function execution menu on a predetermined second location. At this time, the controller 130 may display the unlocking menu or the function execution menu according to a screen currently displayed on the display 110.

For example, when a lock screen is displayed on the display 110, the controller 130 may display the unlocking menu or the function execution menu. Also, when a main screen or an application execution screen is displayed, the controller 130 may display the function execution menu.

Also, when the object is moved to the unlocking menu by bending the display 110, the controller 130 may unlock the lock screen and may display the main screen. When the object is moved to the function execution menu by bending the display 110, the controller 130 may execute a predetermined application and may display an application execution screen.

For example, when a lock screen 710 is displayed on the display 110 and a predetermined user manipulation is input, as shown in FIG. 19, an object 720 and a unlocking menu 730 are displayed on the lock screen 710. After that, when the left of the display 110 is bent in the Z+ direction and the object 720 is moved to the position of the unlocking menu 730, the lock screen may be unlocked and a main screen 740 may be displayed.

Also, when a main screen 810 is displayed on the display 110 and a predetermined user manipulation is input, as shown in FIG. 20, an object 820 and a function execution menu 830 may be displayed. After that, when the left of the display 110 is bent in the Z+ direction and the object 820 is moved to the function execution menu 830, a function mapped onto the function execution menu 830 may be performed and a message application execution screen 840 may be displayed.

Also, when an e-book application execution screen 910 is displayed on the display 110 and a predetermined user manipulation is input as shown in FIG. 21, an object 920 and a function execution menu 930 may be displayed. After that, when the left of the display 110 is bent in the Z+ direction and the object 920 is moved to the function execution menu 930, a function mapped to the function execution menu 930 may be performed. That is, a photo application may be executed and an image 940 of the photo application may be displayed.

In the above-described exemplary embodiments, when the object is moved to the position of the unlocking menu or the function execution menu by bending the display 110, the object disappears from the screen. However, this is merely an example.

That is, when a user manipulation to bend the display 110 is not input for a predetermined time while the object is being displayed, the controller 130 may remove the object, the unlocking menu, and the function execution menu from the screen.

Also, when the specific button provided on the flexible display apparatus 100 is pressed or the touch manipulation on the display 110 is input in addition to the user manipulation to bend the display 110, the controller 130 may remove the object, the unlocking menu, and the function execution menu from the screen. Also, when the specific button provided on the flexible display apparatus 100 is pressed or the touch manipulation on the display 110 is input, the controller 130 may display a UI on the screen to ask whether the user wants to remove the object, and may receive a separate user command to remove the object through the UI.

The object may be displayed on a predetermined location of the screen in predetermined size. However, the display location and the size of the object may be set and changed by the user. A detailed explanation of this will be provided with reference to FIGS. 22 and 23.

Figure 22:
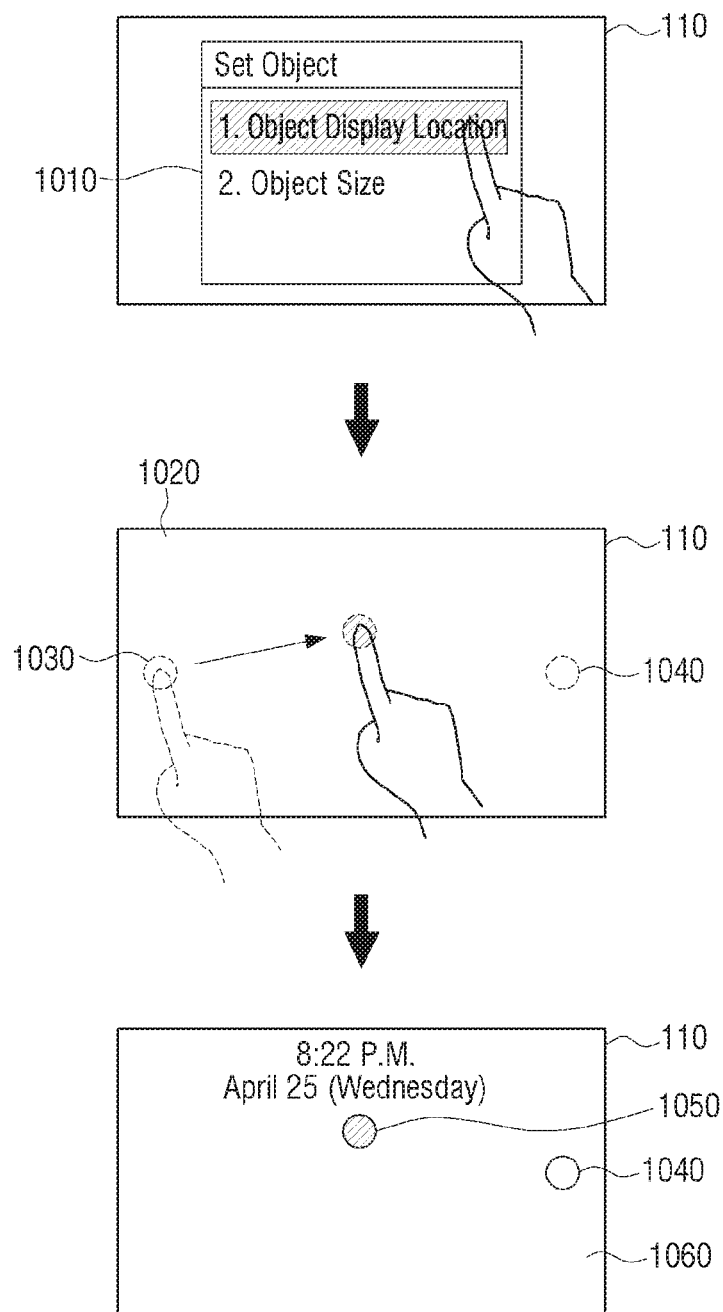
FIGS. 22 and 23 are views illustrating a method for setting parameters of an object according to an exemplary embodiment.
Figure 23:
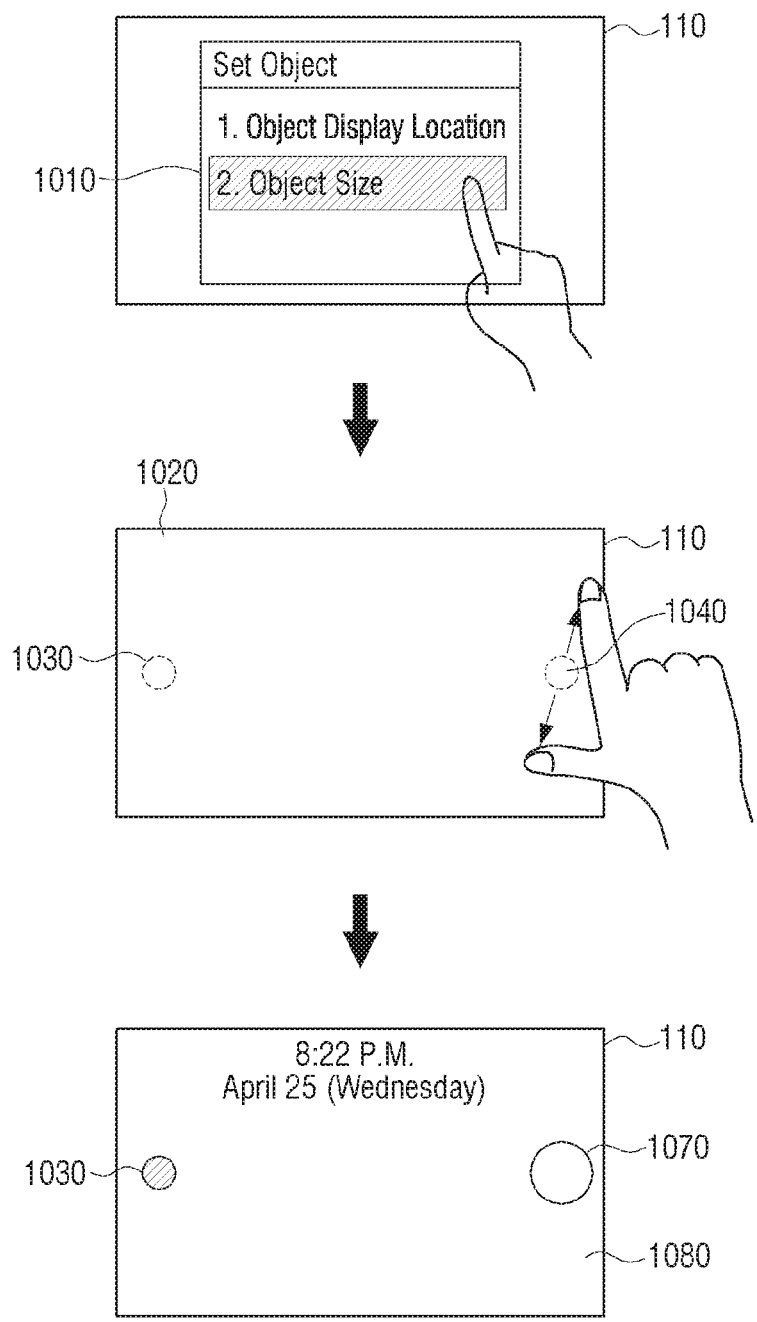

FIGS. 22 and 23 are views to illustrate a method for setting parameters of an object according to an exemplary embodiment.

When a user manipulation to set parameters of an object is input, the controller 130 may display a UI screen to set a display location or a size of the object on the display 110. The controller 130 may set the display location or size of the object based on a user manipulation which is input to the UI screen.

For example, when a menu to set the display location of the object is selected through a displayed UI screen 1010 according to a user manipulation, as shown in FIG. 22, the controller 130 may display an object 1030 to unlock the lock state and a setting screen 1020 to set a location of a unlocking menu 1040.

When the user changes the location of the object 1030 by input on the setting screen 1020, the controller 130 may set the location where the object 1030 is displayed as a changed location. Accordingly, when a lock screen 1060 is displayed, an object 1050 may be displayed on the changed location on the lock screen 1060.

In the above-described exemplary embodiment, the location of the object is changed. However, the controller 130 may change a display location of the unlocking menu according to a user manipulation. Also, the controller 130 may change the display locations of the object and the unlocking menu in a method other than the drag and drop method. For example, the location of the object or the unlocking menu may be changed by touching the object and then touching a position at which the user wants to place the object.

On the other hand, when a menu to change the size of the object is selected through the displayed UI screen 1010 according to a user manipulation as shown in FIG. 23, the controller 130 may display the object 1030 to unlock the lock state and the setting screen 1020 to set a size of the unlocking menu 1040.

When the user changes the size of the unlocking menu 1040 by inputting a pinch-in manipulation/pinch-out manipulation on the setting screen 1020, the controller 130 may set the size of the displayed unlocking menu 1040 as a changed size. In this case, the size of the unlocking menu 1040 may be enlarged by the pinch-out manipulation, and the size of the unlocking menu 1040 may be reduced by the pinch-in manipulation.

Accordingly, when a lock screen 1080 is displayed, the unlocking menu 1040 may be enlarged and display on the lock screen 1060.

Although the size of the unlocking menu is changed in the above-described exemplary embodiment, the size of the object may be changed. Also, the size of the object and the unlocking menu may be changed in a method other than the pinch-in manipulation or pinch-out manipulation. For example, when the user touches the unlocking menu and bends the display at the center in the Z+ direction, the controller 130 may enlarge the size of the unlocking menu. On the contrary, when the user touches the unlocking menu and bends the display at the center in the Z− direction, the controller 130 may reduce the size of the unlocking menu.

Also, in the above-described exemplary embodiments, the display location and the size of the object and the unlocking menu are changed. However, this is merely an example. That is, when a user manipulation is input while the lock screen is being displayed, the controller 130 may display a setting screen to set the location and the size of the object and the unlocking menu, and, when a user manipulation is input while the main screen is being displayed, the controller 130 may display a setting screen to set the location and the size of the object and the function execution menu. Accordingly, the location and the size of the object and the function execution menu may be changed in the same method as described in FIGS. 22 and 23.

In the above-described exemplary embodiments, when the object displayed on the screen is moved, the lock state is unlocked or a specific function is performed. However, this is merely an example. That is, the user may use various methods other than moving the object, and a detailed explanation of this will be provided with reference to FIGS. 24 to 27.

FIGS. 24 to 27 are views to illustrate various methods for performing operations of the flexible display apparatus according to an exemplary embodiment.

When the display 110 is bent, the controller 130 may display an animation effect on a lock screen, and, when a specific condition is satisfied by the animation effect, the controller 130 may unlock the lock screen or may perform a specific function.

Figure 24:
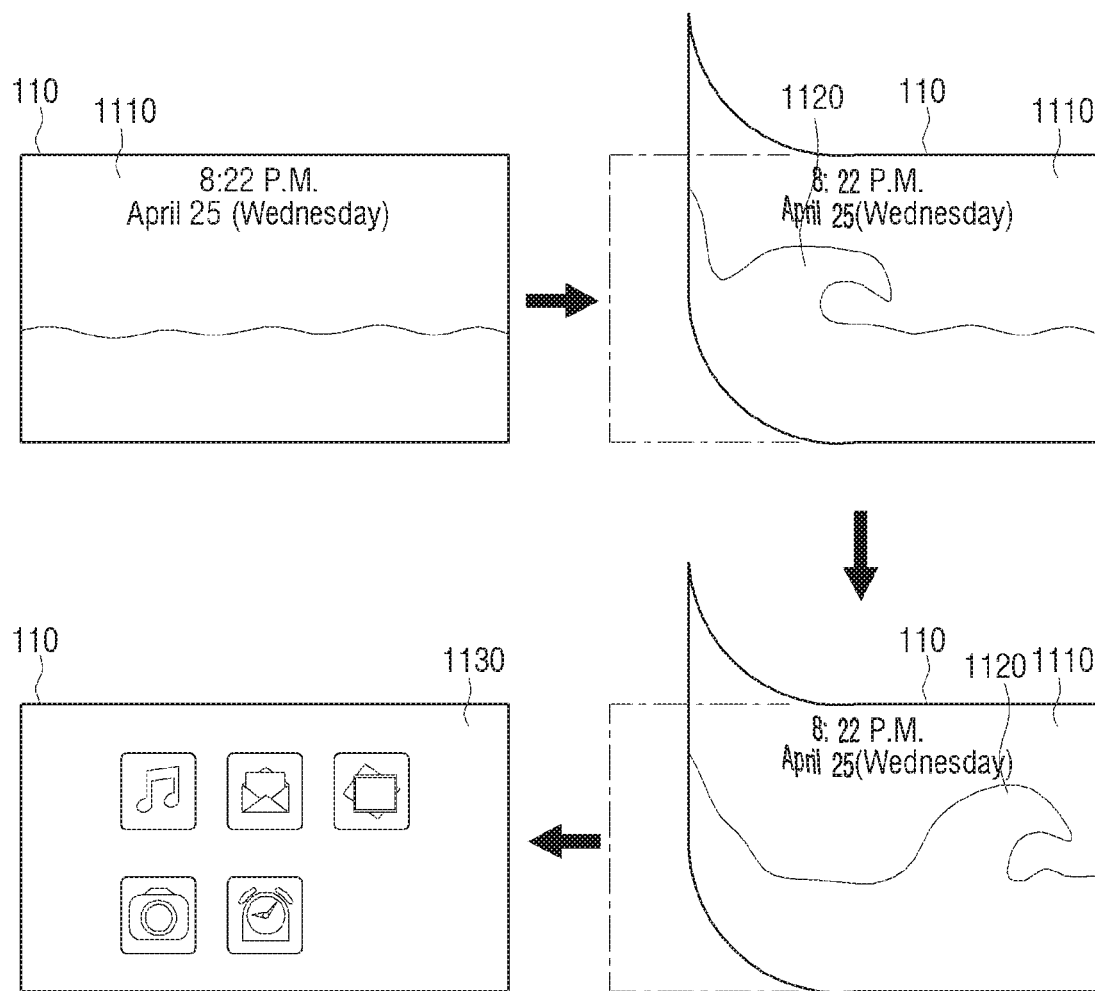
FIGS. 24 to 27 are views illustrating various methods for performing operations of a flexible display apparatus according to an exemplary embodiment.

For example, as shown in FIG. 24, the controller 130 may display a lock screen including a sea image 1110, and may display an animation effect showing that waves 1120 are moving from the left to the right on the sea image 1110 while the left of the display 110 is bent in the Z+ direction. Accordingly, when the waves 1120 reach the right edge of the lock screen, the controller 130 may unlock the lock screen and may display a main screen 1130 on the display 110.

Figure 25:
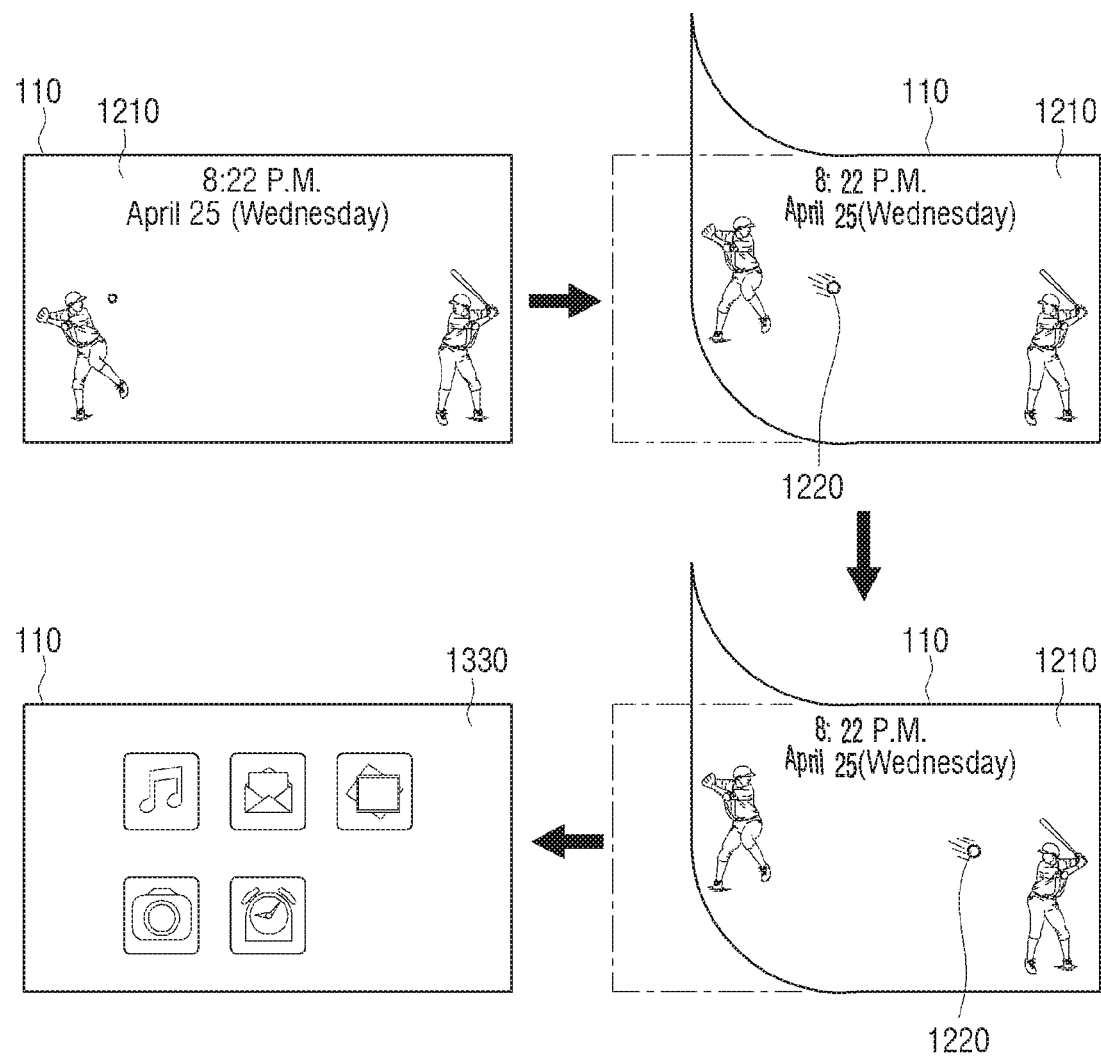

Also, as shown in FIG. 25, the controller 130 may display a lock screen including a baseball image 1210, and may display an animation effect showing that a baseball 1220 is moving from the left to the right on the baseball image 1210 while the left of the display 110 is bent in the Z+ direction.

Accordingly, when the baseball 1220 reaches the right edge of the lock screen, the controller 130 may unlock the lock screen and may display a main screen 1230 on the display 110.

On the other hand, it is assumed that an image having a size larger than the display 110 is displayed on a lock screen. Accordingly, a part of the image is displayed on the lock screen.

In this case, when the display 110 is bent, the controller 130 may display the other parts of the image. At this time, the controller 130 may determine the other part of the image to be displayed based on a bending state of the display 110.

For example, when the left of the display 110 is bent in the Z+ direction, the controller 130 may gradually display the left part of the image that is not currently displayed, and, when the right of the display 110 is bent in the Z+ direction, the controller 130 may gradually display the right part of the image that is not currently displayed. Also, when the upper side of the display 110 is bent in the Z+ direction, the controller 130 may gradually display the upper part of the image that is not currently displayed, and, when the lower side of the display 110 is bent in the Z+ direction, the controller 130 may gradually display the lower part of the image that is not currently displayed.

Also, when a predetermined area of an image is displayed, the controller 130 may unlock the lock screen and display a main menu screen or perform a specific function. For example, when a leftmost area, a rightmost area, an uppermost area, or a lowermost area of an image is displayed, the controller 130 may unlock the lock screen and display a main menu screen or perform a specific function.

Figure 26:
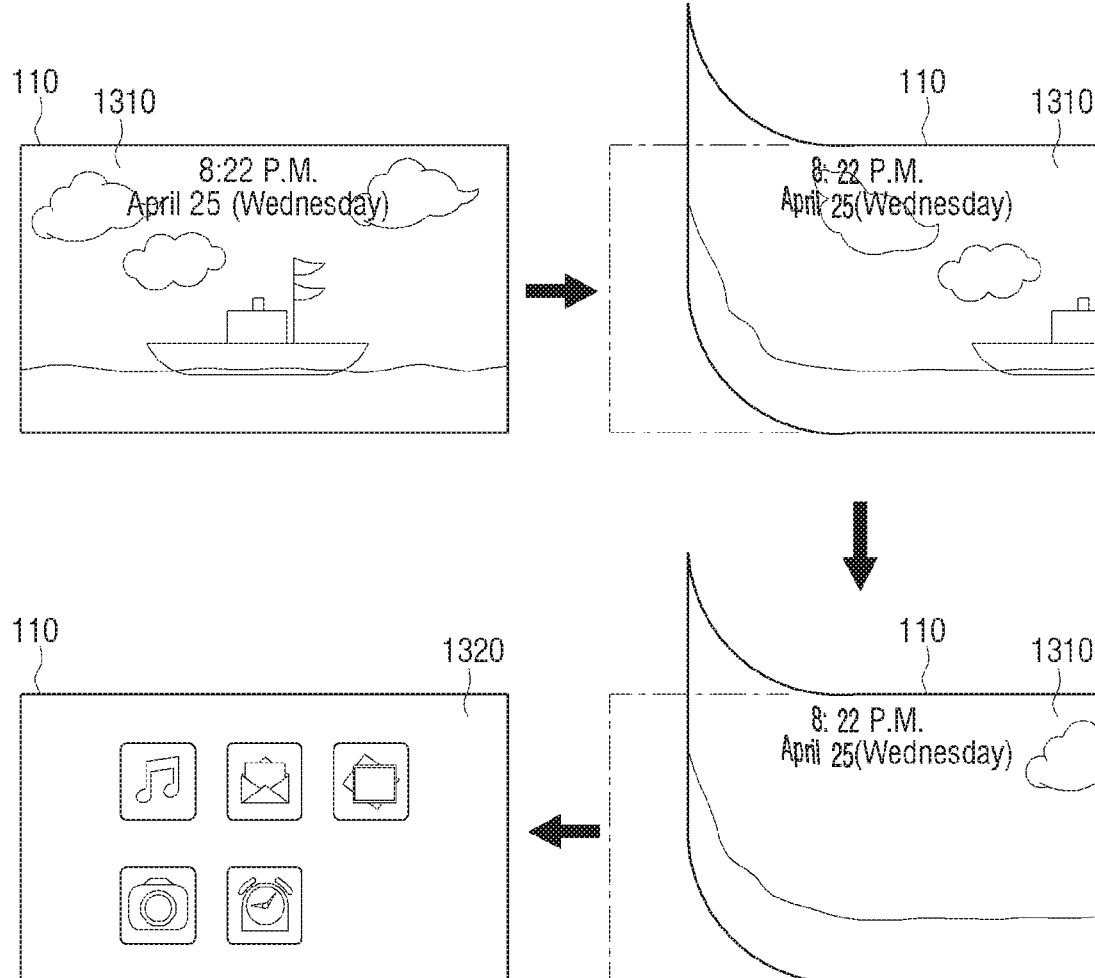

That is, when an image 1310 having a size larger than the display 110 is displayed on a lock screen as shown in FIG. 26, and when the left of the display 110 is bent in the Z+ direction, the left area of the image is gradually displayed. Accordingly, when the leftmost area of the image 1310 is displayed, the lock screen may be unlocked and a main menu screen 1320 may be displayed.

In the above-described exemplary embodiment, only the image having the size larger than the display 110 is displayed on the lock screen. However, this is merely an example. That is, the controller 130 may display an object on the lock screen along with the image having the size larger than the display 110, and may unlock the lock screen and display the main menu screen or perform a specific function according to a bending state of the display 110.

Specifically, the controller 130 may move the object according to bending of the display 110, and may control the display 110 to gradually display the other areas of the image according to a moving direction of the object. That is, when the controller 130 moves the object according to bending of the display 110, the controller 130 may gradually display an area that exists in the moving direction of the object with reference to the currently displayed area of the whole image.

For example, when the left of the display 110 is bent in the Z+ direction and the object is moved to the right of the display 110, the controller 130 may gradually display the left area of the image that is not currently displayed, and, when the right of the display 110 is bent in the Z+ direction and the object is moved to the left of the display 110, the controller 130 may gradually display the right area of the image that is not currently displayed. Also, when the upper side of the display 110 is bent in the Z+ direction and the object is moved to the lower side of the display 110, the controller 130 may gradually display the upper area of the image that is not currently displayed, and, when the lower side of the display 110 is bent in the Z+ direction and the object is moved to the upper side of the display 110, the controller 130 may gradually display the lower area of the image that is not currently displayed.

Also, when the object reaches a predetermined location, the controller 130 may unlock the lock screen and may display a main screen or perform a specific function.

Figure 27:
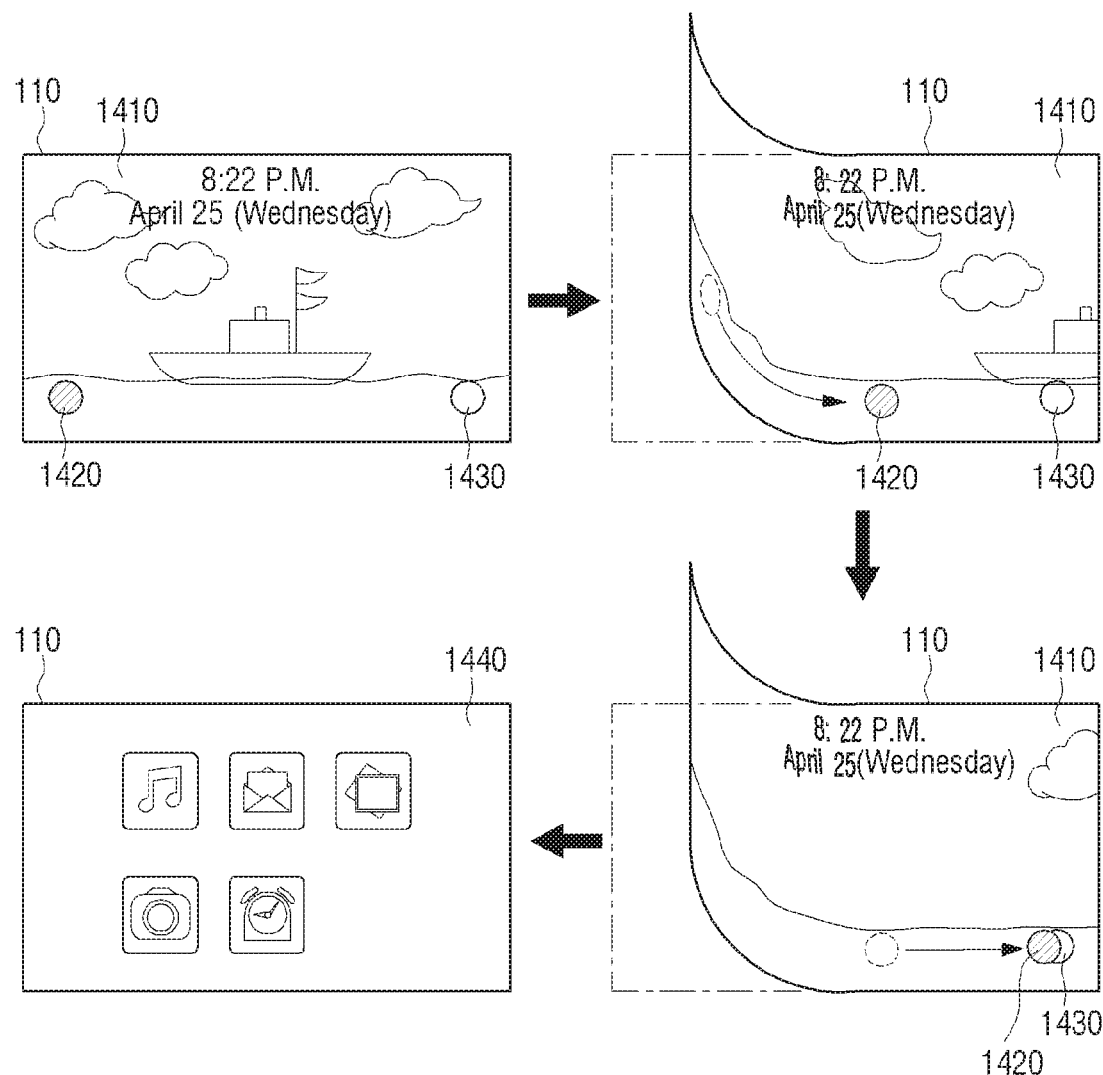

For example, it is assumed that a lock screen including an image 1410 having a size larger than the display 110, an object 1420, and a unlocking menu 1430 is displayed on the display 110 as shown in FIG. 27. In this case, when the left of the display 110 is bent in the Z+ direction, the object 1420 is moved to the right of the display 110 and the left area of the image 1410 is gradually displayed. Accordingly, when the object 1420 reaches the unlocking menu 1430, the lock screen may be unlocked and a main screen 1440 may be displayed on the display 110.

Figure 28:
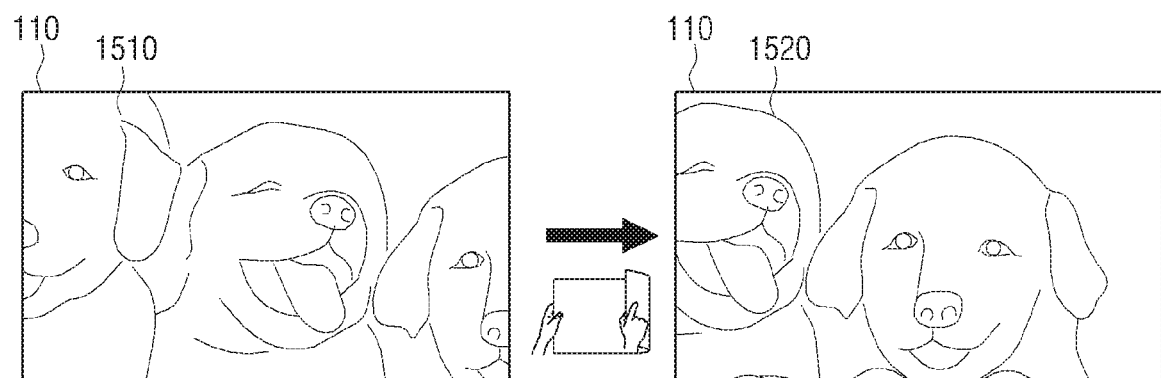
FIGS. 28 and 29 are views illustrating a display method of a flexible display apparatus according to an exemplary embodiment.
Figure 29:
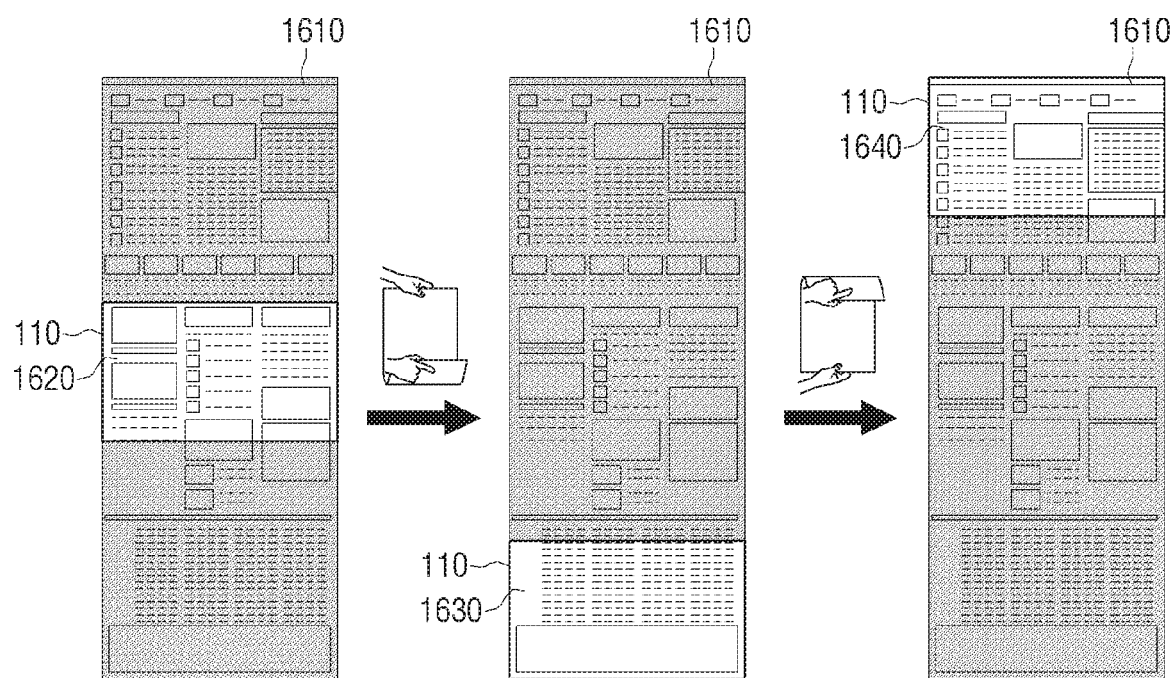

FIGS. 28 and 29 are views to illustrate a display method of a flexible display apparatus according to an exemplary embodiment.

When some areas constituting a content screen having a size larger than the display 110 are displayed on the display 110, and the display 110 is bent, the controller 130 may display another area in accordance with the bending. The content screen recited herein may be a screen on which various contents, such as an image, a text, and a web page are displayed, and for example, may include an execution screen of a running application.

That is, when only some areas of the content screen are displayed on the display 110, the controller 130 may display an area that is not currently displayed on the display 110 according to bending of the display 110. Specifically, when the display 110 is bent, the controller 130 may display the area of the content screen that corresponds to the bending area from among all of the areas of the content screen.

For example, when the left of the display 110 is bent in the Z+ direction, the controller 130 may gradually display the left area of the image that is not currently displayed, and, when the right of the display 110 is bent in the Z+ direction, the controller 130 may gradually display the right area of the image that is not currently displayed. Also, when the upper side of the display 110 is bent in the Z+ direction, the controller 130 may gradually display the upper area of the image that is not currently displayed, and, when the lower side of the display 110 is bent in the Z+ direction, the controller 130 may gradually display the lower area of the image that is not currently displayed.

For example, it is assumed that some area 1510 of an image is displayed on the display 110 as shown in FIG. 28. In this case, when the right of the display 110 is bent in the Z+ direction, a right area 1520 of the image that is not currently displayed may be gradually displayed.

Also, it is assumed that some area 1620 of a whole web page screen 1610 is displayed on the display 110 as shown in FIG. 29. In this case, when the lower side of the display 110 is bent in the Z+ direction, a lower area 1630 of the whole web page screen 1610 may be gradually displayed, and, when the upper side of the display 110 is bent in the Z+ direction, an upper area 1640 of the whole web page screen 1610 may be gradually displayed. That is, an operation like a scroll manipulation of a mouse may be performed.

In the above-described exemplary embodiments, the display 110 is bent in the Z+ direction. However, when the display 110 is bent in the Z− direction rather than the Z+ direction, the area that is not currently displayed may be displayed.

The controller 130 may map bending of the display 110 to an arrow key manipulation, and may move an object or may display an area of content that is not currently displayed. The array key may include four-direction keys (up/low/left/right) or eight-direction keys (up/upper left/left/lower left/low/lower right/right/upper right).

For example, when the left of the display 110 is bent with reference to a center of the display 110, the controller 130 may move an object displayed on the screen to the left, and, when the right of the display 110 is bent with reference to the center of the display 110, the controller 130 may move an object displayed on the screen to the right. Also, when the upper side of the display 110 is bent with reference to the center of the display 110, the controller 130 may move an object displayed on the screen to the upper side, and, when the lower side of the display 110 is bent with reference to the center of the display 110, the controller 130 may move an object displayed on the screen to the lower side.

Accordingly, when the object reaches a position associated with a unlocking menu or a function execution menu, the controller 130 may unlock the lock screen or may perform a specific function associated with the position.

Also, when the left of the display 110 is bent with reference to the center of the display 110, the controller 130 may gradually display a left area of a content screen that is not currently displayed, and, when the right of the display 110 is bent with reference to the center of the display 110, the controller 130 may display a right area of the content screen that is not currently displayed. Also, when the upper side of the display 110 is bent with reference to the center of the display 110, the controller 130 may gradually display an upper area of the content screen that is not currently displayed, and, when the lower side of the display 110 is bent with reference to the center of the display 110, the controller 130 may display a lower area of the content screen that is not currently displayed.

As described above, the controller 130 may map the bending manipulation of the display 110 onto the arrow key manipulation, and may control the object or the content screen according to the location of the bending area of the display 110.

Also, the controller 130 may execute a function corresponding to a menu selected on a main screen, and may display an execution resulting screen. For example, when a web browser execution menu displayed on a main screen is selected, the controller 130 may access a web server through a communicator (not shown), receive a web page screen from the web server, and display the web page screen on the display 110. Also, when a photo application running menu displayed on the main menu is selected, the controller 130 may display an image pre-stored in the flexible display apparatus 100 on the display 110.

When the display 110 is bent in a first direction while an executing resulting screen is being displayed, the controller 130 may align at least one object included in the execution resulting screen on an edge area of the execution resulting screen and display the aligned object. The object recited herein may include an image, a text, and an application execution screen.

In this case, the controller 130 may adjust at least one of a size and a shape of the at least one object, and may align the object on the edge area. When the flexible display apparatus 100 is bent in a second direction which is opposite the first direction while the at least one object is aligned on the edge area and displayed, the controller 130 may restore the at least one object to its original state and display it. A detailed explanation of this will be provided with reference to FIG. 31.

Figure 30:
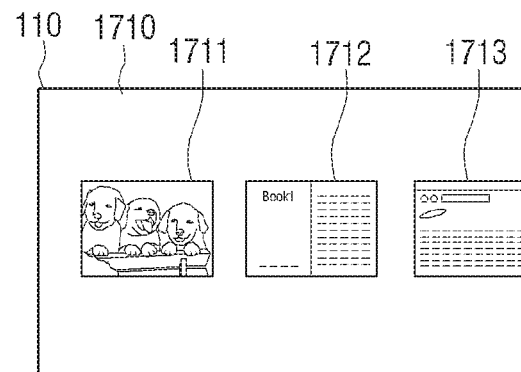
FIG. 30 is a view illustrating an example of a method for changing a display state of an object based on a bending direction of the flexible display apparatus according to an exemplary embodiment.
Figure 30:
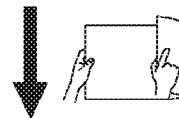
Figure 30:
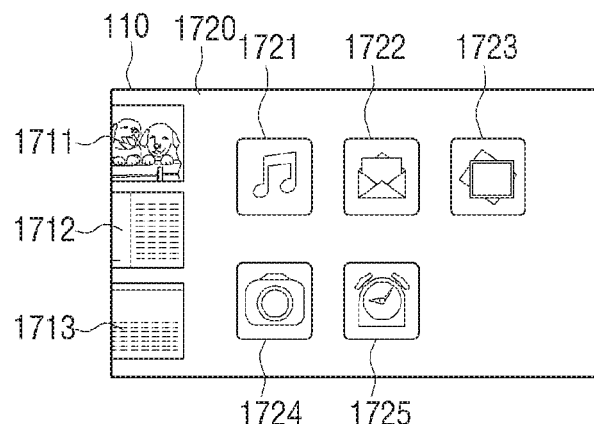
Figure 30:
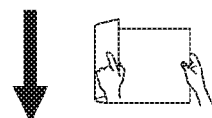
Figure 30:
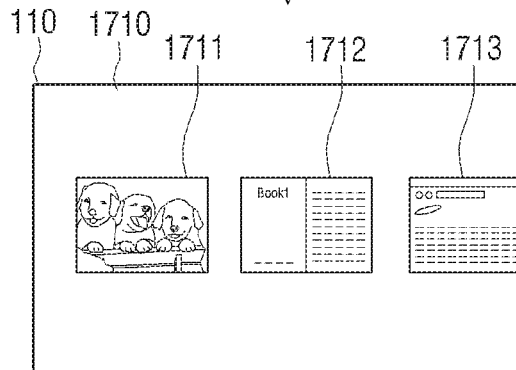

FIG. 30 is a view to illustrate an example of a method for changing a display state of an object based on a bending direction of the flexible display apparatus according to an exemplary embodiment.

When a specific button provided on the flexible display apparatus 100 is pressed or a specific icon displayed on the display 110 is touched, an information display screen of a currently executed application may be displayed on the display 110. The application information display screen recited herein may include an icon corresponding to the currently executed application or an execution screen of the currently executed application.

When a plurality of application are running at the same time according to a multi-tasking function, an icon or an execution screen corresponding to each application may be displayed on the display 110. That is, an application information display screen 1710 including a plurality of application execution screens 1711, 1712, and 1713 may be displayed on the display 110 as shown in FIG. 30.

When the right of the display 110 is bent in the Z+ direction while the application information display screen 1710 is being displayed, the plurality of application execution screens 1711, 1712, and 1713 displayed on the display 110 may be reduced in their sizes, moved to the left edge area of the display 110, aligned in a vertical direction, and displayed. A main screen 1720 including a plurality of icons 1721 to 1725 may be displayed on the display 110. However, this is merely an example and a screen including at least one of an icon, a widget, and an image may be displayed.

When the left of the display 110 is bent in the Z+ direction, the main screen 1720 may disappear and the application information display screen 1710 may be displayed on the display 110.

In the above-described exemplary embodiment, when the right of the display is bent, the object displayed on the screen is moved to the left edge area of the display and displayed. However, this is merely an example and the object displayed on the screen may be moved and displayed according to a bending area of the display 110. That is, when the left of the display is bent, the object displayed on the screen may be moved to the left edge area of the display and displayed. Also, when the display is bent in the Z− direction other than the Z+ direction, the object may be moved to the edge area and restored to its original state.

The controller 130 may control a mode of the flexible display apparatus 100. The mode recited herein may include a power off mode, a screen off mode, a lock screen mode, a security screen mode, and a screen activation mode.

Specifically, when a power off command is input, the controller 130 shuts off the power supplied to each element of the flexible display apparatus 100 and turns off the screen of the display 110. In such a power off mode, an operation corresponding to another user manipulation is not performed until a power on command is input.

When there is no user input to the flexible display apparatus 100 for a predetermined time in a power-on state (or based on a command of a user), the controller 130 turns off the screen of the display 110 and enters the screen off mode. In this case, when a specific button provided on the flexible display apparatus 100 is pressed or a touch manipulation is input on the display 110, the controller 130 may display a lock screen on the display 110.

The lock screen mode is a state in which a lock screen is displayed. In this case, the controller 130 does not perform an operation corresponding to a user manipulation other than a user manipulation to unlock the lock screen.

When the user manipulation to unlock the lock screen is input while the lock screen is being displayed, the controller 130 unlocks the lock screen and enters the screen activation mode. In the screen activation mode, operations corresponding to various user manipulations may be performed. For example, when the lock screen is unlocked, the controller 130 may display a main screen on the display 110, and may execute an application corresponding to an icon that is selected from among icons displayed on the main screen.

The security screen mode is a mode in which a predetermined password or a specific touch manipulation is required in order to enter the screen activation mode. When a specific button provided on the flexible display apparatus 100 is pressed or a touch manipulation on the display 110 is input in the security screen mode, the controller 130 may display a UI screen to receive a password or a touch manipulation on the display 110. Also, when the predetermined password or the specific touch manipulation is input through the UI screen, the controller 130 may enter the screen activation mode.

In the above-described exemplary embodiment, when the specific button is pressed or the touch manipulation is input, the controller 130 displays the lock screen. However, this is merely an example. That is, the controller 130 may display the lock screen based on a bending manipulation or other user input.

For example, when a predetermined location of the display 110 is bent, the predetermined location of the display 110 is bent by a predetermined angle, the predetermined location of the display 110 is bent a predetermined number of times, the predetermined location of the display 110 is bent in a specific direction, the predetermined location of the display 110 is bent for a predetermined time, or the predetermined location of the display 110 is bent at a predetermined speed, the controller 130 may display the lock screen and may enter the lock screen mode.

Figure 31:
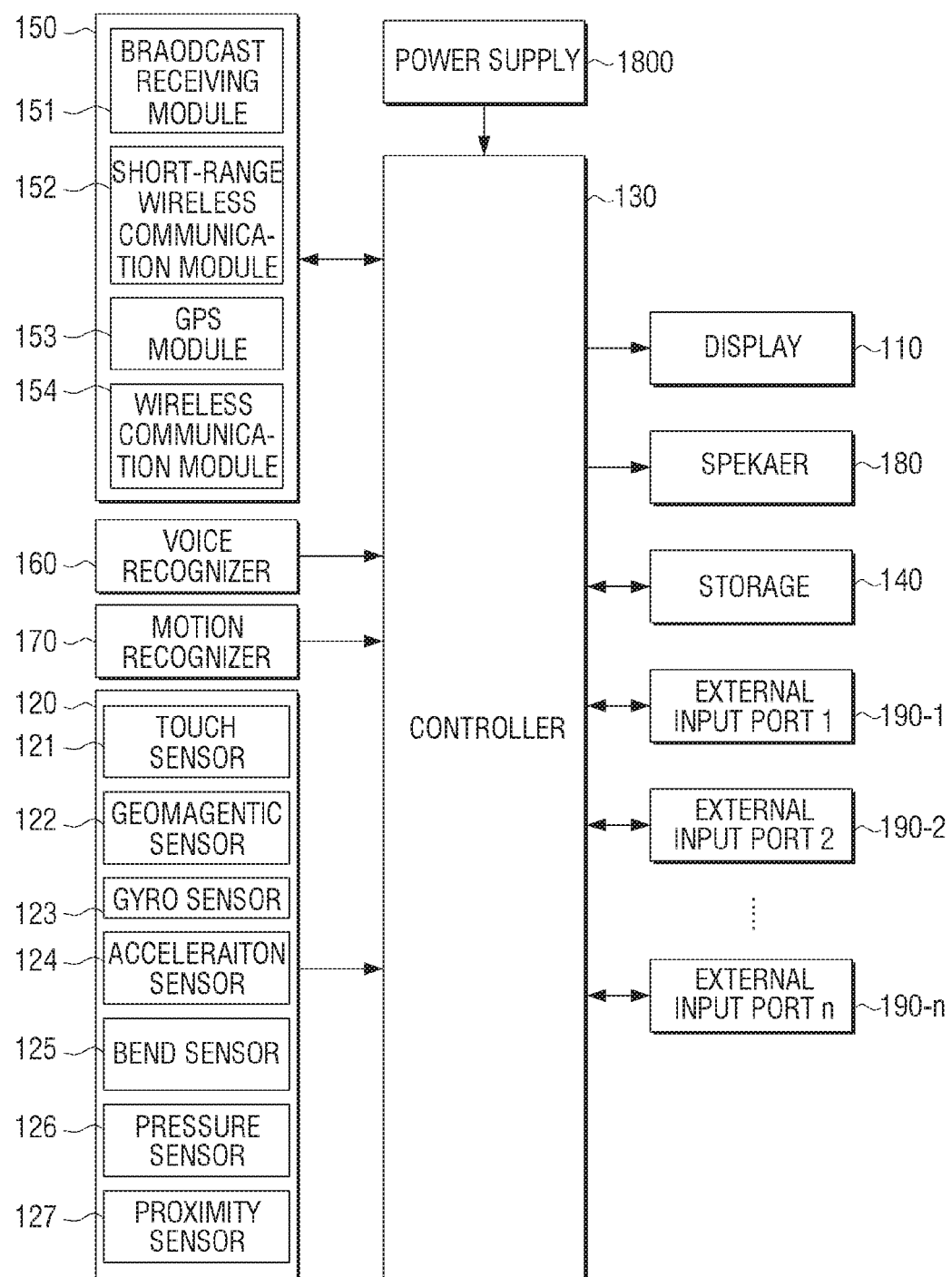
FIG. 31 is a block diagram illustrating a detailed configuration of a flexible display apparatus according to an exemplary embodiment.

FIG. 31 is a block diagram to illustrate a detailed configuration of a flexible display apparatus according to an exemplary embodiment. Referring to FIG. 31, a flexible display apparatus 100 includes a display 110, a sensor 120, a controller 130, a storage 140, a communicator 150, a voice recognizer 160, a motion recognizer 170, a speaker 180, external input ports 190~190-n, and a power supply 1800. In explaining FIG. 32, explanation of elements discussed above with respect to FIG. 1 is omitted.

The storage 140 may store various programs or data associated with the operation of the flexible display apparatus 100, setting information set by the user, system operating software, various application programs, and information on operations corresponding to a user's manipulation.

The sensor 120 senses a bending manipulation on the flexible display apparatus 100 and a touch manipulation input through the display 110. Referring to FIG. 26, the sensor 120 may include various kinds of sensors such as a touch sensor 121, a geomagnetic sensor 122, a gyro sensor 123, an acceleration sensor 124, a bend sensor 125, a pressure sensor 126, and a proximity sensor 127, etc.

The touch sensor 121 may be implemented by using a capacitive type or a resistive type of sensor. The capacitive type calculates touch coordinates by sensing minute electricity excited in a user's body when a part of the user's body touches the surface of the display 110, using a dielectric substance coated on the surface of the display 110. The resistive type includes two electrode plates, and, when a user touches a screen, calculates touch coordinates by sensing an electric current flowing due to contact between upper and lower plates at the touched point. As described above, the touch sensor 121 may be embodied in various forms.

The geomagnetic sensor 122 and the gyro sensor 123 sense a rotation state and a moving direction of the flexible display apparatus 100. The acceleration sensor 124 senses a degree of tilt of the flexible display apparatus 100. As described above, the geomagnetic sensor 122, the gyro sensor 123, and the acceleration sensor 124 may be used to sense bending characteristics such as a bending direction or a bending area of the flexible display apparatus 100. However, the geomagnetic sensor 122, the gyro sensor 123, and the acceleration sensor 124 may be used to sense a rotation state or a tilt state of the flexible display apparatus 100.

The bend sensor 125 may be embodied in various shapes and numbers as described above with reference to FIGS. 3 to 6, and may sense a bending state of the flexible display apparatus 100. The configuration and operation of the bend sensor 125 has been described above and thus a redundant explanation is omitted.

The pressure sensor 126 senses a magnitude of pressure exerted to the flexible display apparatus 100 when the user performs a touch or bending manipulation, and provides the magnitude of pressure to the controller 130. The pressure sensor 126 may include a piezo film embedded in the display 110 and outputs an electric signal corresponding to the magnitude of pressure. Although the pressure sensor 126 is a separate element from the touch sensor 121 in FIG. 31, if the touch sensor 121 is implemented by using a resistive touch sensor, the resistive touch sensor may also perform the function of the pressure sensor 126.

The proximity sensor 127 senses a motion which approaches without directly contacting the display surface. The proximity sensor 127 may be implemented by using various types of sensors, such as a high-frequency oscillation type proximity sensor which forms a high frequency magnetic field and detects an electric current induced by a magnetic characteristic which is changed when an object approaches, a magnetic type proximity sensor which uses a magnet, a capacitive type proximity sensor which detects capacitance that changes when an object approaches, etc.

The controller 130 analyzes a result of sensing by the sensor 120, determines a deformation state of the display 110, and performs an operation corresponding to the deformation state. The operation that is performed by the controller 130 when the display 110 is deformed has been described above and thus a redundant explanation is omitted.

The communicator 150 may communicate with various types of external apparatuses according to various communication methods. The communicator 150 may include various communication modules such as a broadcast receiving module 151, a short-range wireless communication module 152, a GPS module 153, and a wireless communication module 154. The broadcast receiving module 151 may include a terrestrial broadcast receiving module (not shown) including an antenna to receive a terrestrial broadcast signal, a demodulator, and an equalizer, and a digital multimedia broadcasting (DMB) module to receive and process a DMB broadcast signal. The short-range wireless communication module 152 is a module that communicates with an external apparatus located nearby according to a short-range wireless communication method, such as near field communication (NFC), Bluetooth, or Zigbee, etc. The GPS module 153 is a module that receives a GPS signal from a GPS satellite and detects a current location of the flexible display apparatus 100. The wireless communication module 154 is a module that is connected to an external network according to a wireless communication protocol, such as Wi-Fi or IEEE etc. and communicates with the external network. The wireless communication module 154 may further include a mobile communication module that accesses a mobile communication network and performs communication according to various mobile communication standards such as $3^{rd}$ generation (3G), $3^{rd}$ generation partnership project (3GPP), and long term evolution (LTE).

The controller 130 may selectively activate the communicator 150 and may perform an operation corresponding to a user command. For example, the controller 130 may access a web server through the wireless communication module 154 and may receive web page data from the web server. The controller 130 may configure a web page screen using the web page data, and may display the web page screen on the display 110.

The controller 130 may recognize voice input or motion input besides the bending or touch manipulation, and may perform an operation corresponding to the input. In this case, the controller 130 may activate the voice recognizer 160 or the motion recognizer 170.

The voice recognizer 160 collects a user's voice or an external sound using a voice obtaining means such as a microphone (not shown), and transmits the user's voice or the external sound to the controller 130. When the user's voice is consistent with a pre-set voice command in a voice control mode, the controller 130 may perform a task corresponding to the user's voice. The task, which is controllable using a voice, may include various tasks such as adjusting a volume, selecting a channel, zapping (e.g., changing) a channel, adjusting a display property, reproducing, pausing, rewinding, fast forwarding, executing an application, selecting a menu, turning on an apparatus, and turning off an apparatus.

The motion recognizer 170 obtains a user's image using an image picking up means (not shown) such as a camera, and provides the user's image to the controller 130. When the controller 130 analyzes the user's image and determines that the user makes a motion gesture corresponding to a pre-set motion command in a motion control mode, the controller 130 performs an operation corresponding to the motion gesture. For example, various tasks such as zapping a channel, turning on an apparatus, turning off, pausing, reproducing, stopping, rewinding, fast forwarding, mute, etc. may be controlled according to a motion. The above-described tasks that are controllable according to a voice and the tasks that are controllable according to a motion are merely examples and are not limited.

The external input ports 1, 2, . . . , n 190-1~190-n may be connected to various types of external apparatuses and may receive various data or programs or control commands. Specifically, the external input ports may include USB ports, headset ports, mouse ports, and LAN ports, etc.

The power supply 1800 supplies power to the elements of the flexible display apparatus 100. The power supply 1800 may be implemented by including an anode collector, an anode electrode, an electrolyte, a cathode electrode, a cathode collector, and a sheath enclosing the aforementioned members. The power supply 1800 may be implemented by using a secondary cell which is chargeable and dischargeable. The power supply 1800 may be implemented in a flexible form so that it can be bent along with the flexible display apparatus 100. In this case, the collector, the electrode, the electrolyte, and the sheath may be made of a flexible material. Detailed configuration and material of the power supply 1800 will be explained separately below.

Although FIG. 31 illustrates various elements which may be included in the flexible display apparatus 100, the flexible display apparatus 100 may not necessarily include all of the elements and may not include only the above elements. Therefore, some of the elements may be omitted or added according to a product type of the flexible display apparatus 100, or may be replaced with other elements.

The controller 130 may control the elements according to a user manipulation which is recognized through the sensor 120, the voice recognizer 160, and the motion recognizer 170 described above, and may perform various operations.

Figure 32:
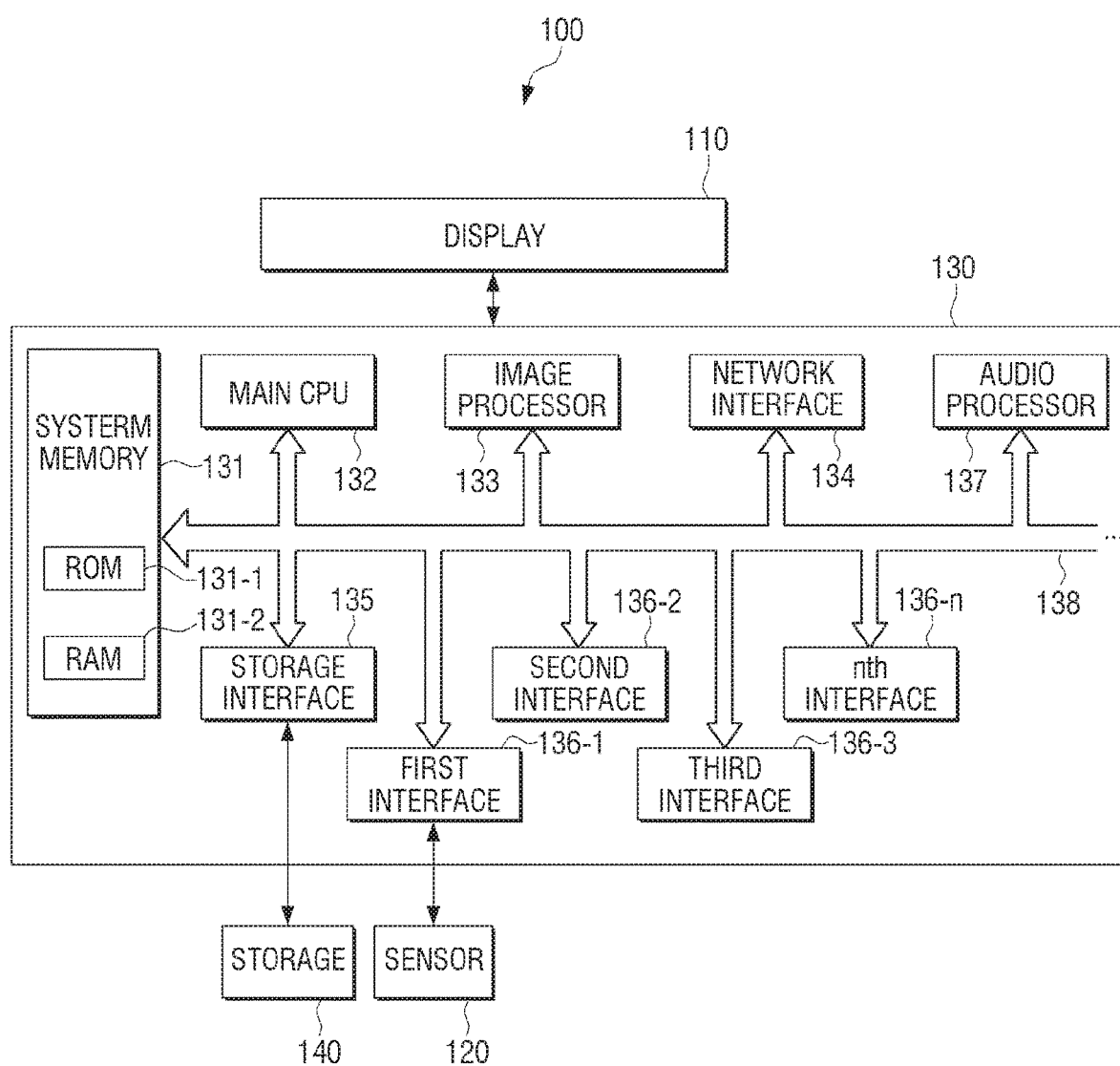
FIG. 32 is a view illustrating a detailed configuration of a controller according to an exemplary embodiment.

FIG. 32 is a view to explain a detailed configuration of the controller 130 according to an exemplary embodiment.

Referring to FIG. 32, the controller 130 may include a system memory 131, a main CPU 132, an image processor 133, a network interface 134, a storage interface 135, first to n-th interfaces 136-1 to 136-n, an audio processor 137, and a system bus 138.

The system memory 131, the main CPU 132, the image processor 133, the network interface 134, the storage interface 135, the first to n-th interfaces 136-1 to 136-n, and the audio processor 137 may be connected through the system bus 138, and may exchange various data or signals through the system bus 138.

The first to n-th interfaces 136-1 to 136-n support interfacing between the elements including the sensor 120 and the elements of the controller 130. In FIG. 32, the sensor 120 is connected to only the first interface 136-1. However, when the sensor 120 includes various types of sensors as shown in FIG. 32, each of the sensors may be connected through each interface. Also, at least one of the first to n-th interfaces 136-1 to 136-n may be implemented by using a button which is provided on a body of the flexible display apparatus 100, or an input interface which receives various signals from an external apparatus which is connected through the external input ports 1 to n.

The system memory 131 includes a read only memory (ROM) 131-1 and a random access memory (RAM) 131-2. The ROM 131-1 stores a set of commands for system booting. If a turn on command is input and power is supplied, the main CPU 132 copies an OS which is stored in the storage 140 into the RAM 131-2 according to a command stored in the ROM 131-1, executes the OS, and boots the system. If booting is completed, the main CPU 132 copies various applications stored in the storage 140 into the RAM 131-2, executes the applications copied into the RAM 131-2, and performs various operations.

As described above, the main CPU 132 may perform various operations according to execution of the application stored in the storage 140.

The storage interface 135 is connected to the storage 140 and exchanges various programs, content, and data etc. with the storage 140.

For example, when the user performs a touch manipulation corresponding to a reproducing command to reproduce and display a content stored in the storage 140, the main CPU 132 accesses the storage 140 through the storage interface 135, generates a list of stored contents, and displays the list on the display 110. In this state, when the user performs a touch manipulation to select one content, the main CPU 132 executes a content reproducing program which is stored in the storage 140. The main CPU 132 controls the image processor 133 to form a content reproducing screen according to a command included in the content reproducing program.

The image processor 133 may include a decoder, a renderer, and a scaler, etc. Accordingly, the image processor 133 decodes a stored content, renders the decoded content data and forms a frame, and scales a size of the frame according to a screen size of the display 110. The image processor 133 provides the processed frame to the display 110 and displays the same.

The audio processor 137 refers to an element that processes audio data and provides the audio data to a sound outputting means such as a speaker 180. The audio processor 137 performs audio signal processing by decoding audio data which is stored in the storage 140 or audio data which is received through the communicator 150, filtering noise, and amplifying the audio data to an appropriate decibel. In the above example, when the content to be reproduced is a moving image content, the audio processor 137 may process the audio data which is de-multiplexed from the moving image content, and may provide the audio data to the speaker 180 so that the audio data is synchronized with the image processor 133 and is output.

The network interface 134 is connected to external apparatuses through the communicator 150. For example, when a web browser program is executed, the main CPU 132 accesses a web server through the network interface 134. When web page data is received from the web server, the main CPU 132 controls the image processor 133 to form a web page screen, and displays the web page screen on the display 110.

Figure 33:
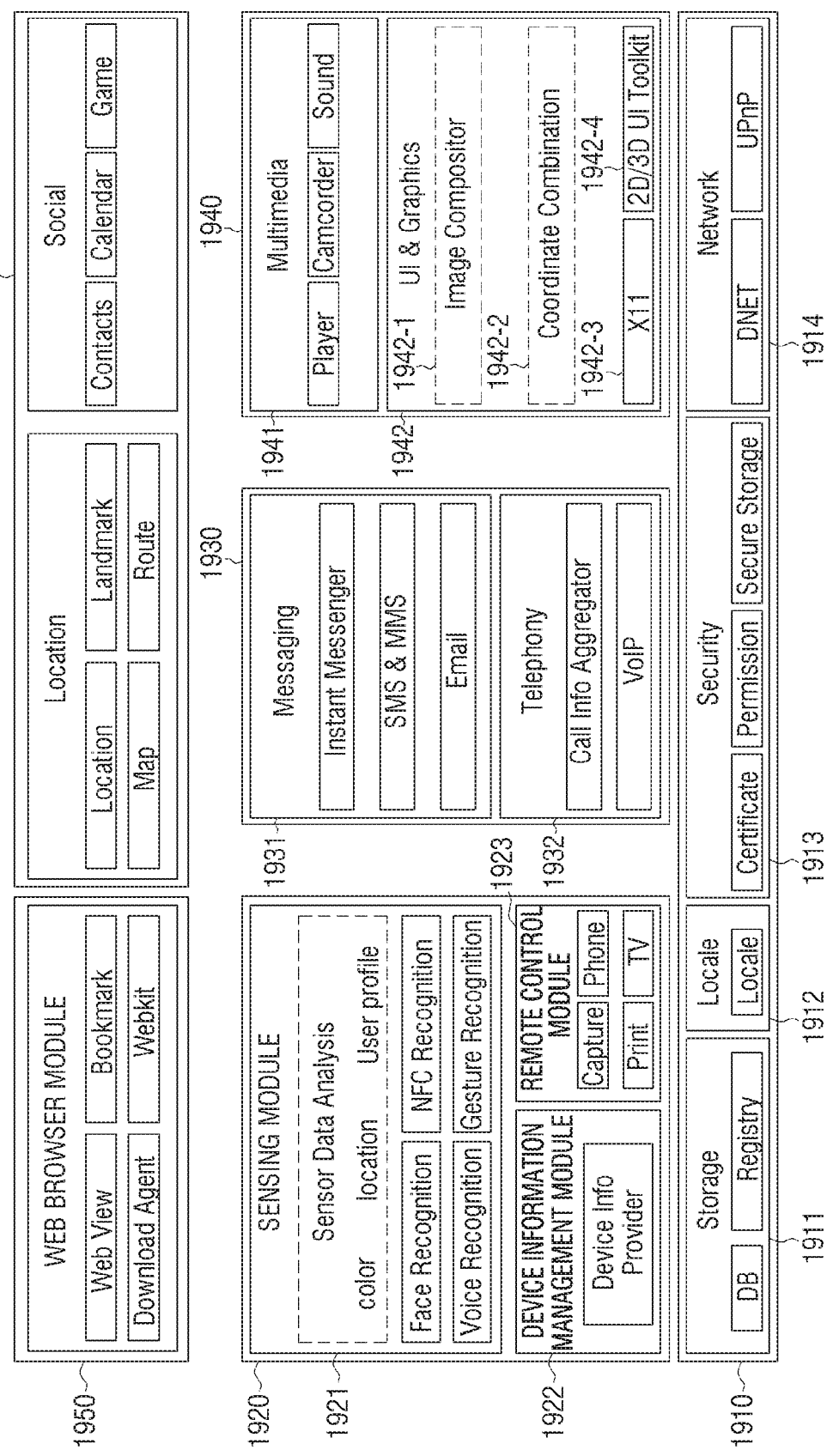
FIG. 33 is a view illustrating a software structure of applications supporting operation of a controller according to various exemplary embodiments.

FIG. 33 is a view illustrating a software structure of application supporting the operations of the controller 130 according to the above-described exemplary embodiments. Referring to FIG. 33, the storage 140 includes a base module 1910, a device management module 1920, a communication module 1930, a presentation module 1940, a web browser module 1950, and a service module 1960.

The base module 1910 is a module that processes signals transmitted from each hardware element that is included in the flexible display apparatus 100, and transmits the signals to an upper layer module.

The base module 1910 includes a storage module 1911, a location-based module 1912, a security module 1913, and a network module 1914.

The storage module 1911 is a program module that manages a database (DB) or a registry. The location-based module 1912 is a program module that is interlocked with hardware such as a GPS chip and supports a location-based service. The security module 1913 is a program module that supports certification for hardware, permission of a request, and a secure storage, and the network module 1914 includes a Distributed.net (DNET) module and a Universal Plug and Play (UPnP) module as a module for supporting network connection.

The device management module 1920 is a module that manages external input and information on an external device, and uses the same. The device management module 1920 may include a sensing module 1921, a device information management module 1922, and a remote control module 1923, etc.

The sensing module 1921 is a module that analyzes sensor data provided from various sensors of the sensor 120. Specifically, the sensing module 1921 is a program module that detects a location of a user or an object, color, shape, size, and other profiles, etc. The sensing module 1921 may include a face recognition module, a voice recognition module, a motion recognition module, and an NFC recognition module. The device information management module 1922 is a module that provides information on various types of devices, and the remote control module 1923 is a program module that remotely controls a peripheral device such as a telephone, a television (TV), a printer, a camera, and an air conditioner, etc.

The communication module 1930 is a module to communicate with an external apparatus. The communication module 1930 includes a messaging module 1931 such as a messenger program, a short message service (SMS) and multimedia message service (MMS) program, and an email program, etc., and a telephony module 1932 which includes a call information aggregator program module and a voice over internet protocol (VoIP) module.

The presentation module 1940 is a module that generates a display screen. The presentation module 1940 includes a multimedia module 1941 to reproduce multimedia content and output the multimedia content, and a user interface (UI) and graphic module 1942 to process a UI and graphics. The multimedia module 1941 may include a player module, a camcorder module, and a sound processing module. Accordingly, the multimedia module 1941 generates a screen and a sound by reproducing various multimedia contents, and reproduces the same. The UI and graphic module 1942 may include an image compositor module 1942-1 to combine images, a coordinate combination module 1942-2 to combine coordinates on a screen to display an image and generate coordinates, an X11 module 1942-3 to receive various events from hardware, and a 2D/3D UI toolkit 1942-4 to provide a tool for configuring a UI of a 2D or 3D format.

The web browser module 1950 is a module that performs web-browsing and accesses a web server. The web browser module 1950 may include a web view module to render and view a web page, a download agent module to download, a bookmark module, and a web-kit module, etc.

The service module 1960 is an application module that provides various services. Specifically, the service module 1960 may include various modules such as a navigation service module to provide a map, a current location, a landmark, and route information, a game module, and an advertisement application module.

The main CPU 132 of the controller 130 accesses the storage 140 through the storage interface 135, copies various modules stored in the storage 140 into the RAM 131-2, and performs operations according to operations of the copied modules.

Specifically, the main CPU 132 analyzes output values of the sensors of the sensor 120 using the sensing module 1921, checks a bending area, a bending line, a bending direction, a number of times that bending is performed, a bending angle, a bending speed, a touch area, a number of times that touch is performed, an intensity of touch, a magnitude of pressure, and a degree of proximity, and, based on a result of the checking, determines the input user manipulation. When it is determined that the user manipulation is intended, the main CPU 132 detects information on an operation corresponding to the user manipulation from the database of the storage module 1910. The main CPU 132 drives a module corresponding to the detected information and performs an operation.

For example, when the operation is displaying a graphic user interface (GUI), the main CPU 132 configures a GUI screen using the image compositor module 1942-1 of the presentation module 1940. Also, the main CPU 132 determines a display location of the GUI screen using the coordinate combination module 1942-2 and controls the display 110 to display the GUI screen on the location.

When a user manipulation corresponding to a message receiving operation is performed, the main CPU 132 executes the messaging module 1941, accesses a massage management server, and receives a message stored in a user account. Also, the main CPU 132 configures a screen corresponding to the received message using the presentation module 1940 and displays the screen on the display 110.

If a telephone call is performed, the main CPU 132 may drive the telephony module 1932.

As described above, programs of various structures may be stored in the storage 140 and the controller 130 may perform various operations using various programs stored in the storage 140.

Figure 34:
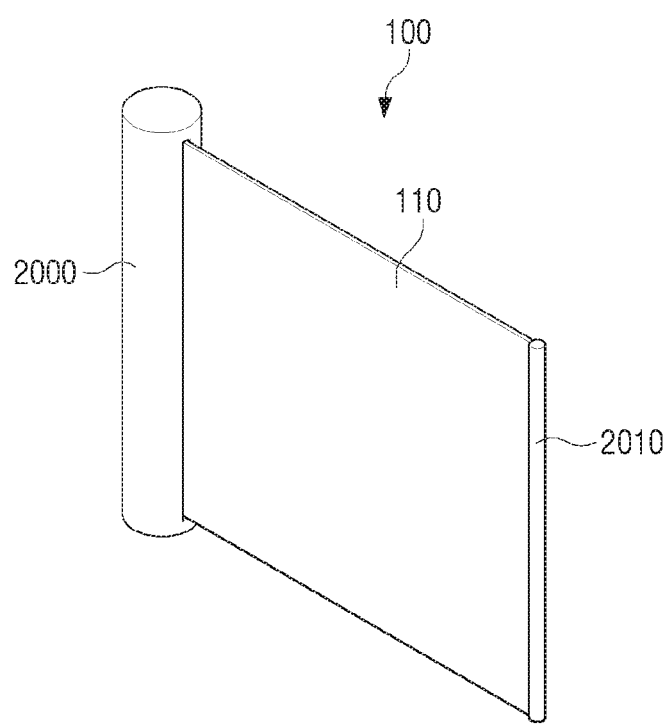
FIG. 34 is a view illustrating an example of a flexible display apparatus according to an exemplary embodiment.

FIG. 34 is a view illustrating an example of a flexible display apparatus which is embedded in a body. Referring to FIG. 34, the flexible display apparatus 100 includes a body 2000, a display 110, and a grip part 2010.

The body 2000 may serve as a kind of a case containing the display 110. When the flexible display apparatus 100 includes various elements as shown in FIG. 31, elements other than the display 110 and some sensors may be mounted in the body 2000. The body 2000 includes a rotary roller for rolling the display 110. Accordingly, when not in use, the display 110 is rolled about the rotary roller and embedded in the body 2000.

When the user holds the grip part 2010 and pulls the display 110, the rotary roller is rotated in the opposite direction to that of the rolling and rolling is released, so that the display 110 comes out to the outside of the body 2000. A stopper may be provided on the rotary roller. Accordingly, when the user pulls the grip part 2010 by more than a predetermined distance, the rotation of the rotary roller is stopped by the stopper and the display 110 may be fixed. Accordingly, the user can execute various functions using the display 110 that is outside of the body 2000. When the user presses a button to release the stopper, the stopper is released and the rotary roller is rotated in a reverse direction. As a result, the display 110 is rolled in the body 2000. The stopper may have a switch shape to stop an operation of a gear to rotate the rotary roller. Since the rotary roller and the stopper may employ a general rolling structure as it is, detailed illustration and explanation thereof are omitted.

The body 2000 includes a power supply 1800. The power supply 1800 may be implemented by using a battery connector on which a disposable battery is mounted, a secondary cell which can be charged and used multiple times by the user, and a solar cell which generates electricity using solar heat. When the power supply is implemented by using the secondary cell, the user may connect the body 2000 to an external power source through a wire and may charge the power supply 1800.

In FIG. 34, the body 2000 has a cylindrical shape. However, the shape of the body 2000 may be quadrangular or other polygonal shape. Also, the display 110 may be implemented in various forms such as enclosing the body 2000, rather than being embedded in the body 2000 and being exposed to the outside by being pulled.

Figure 35:
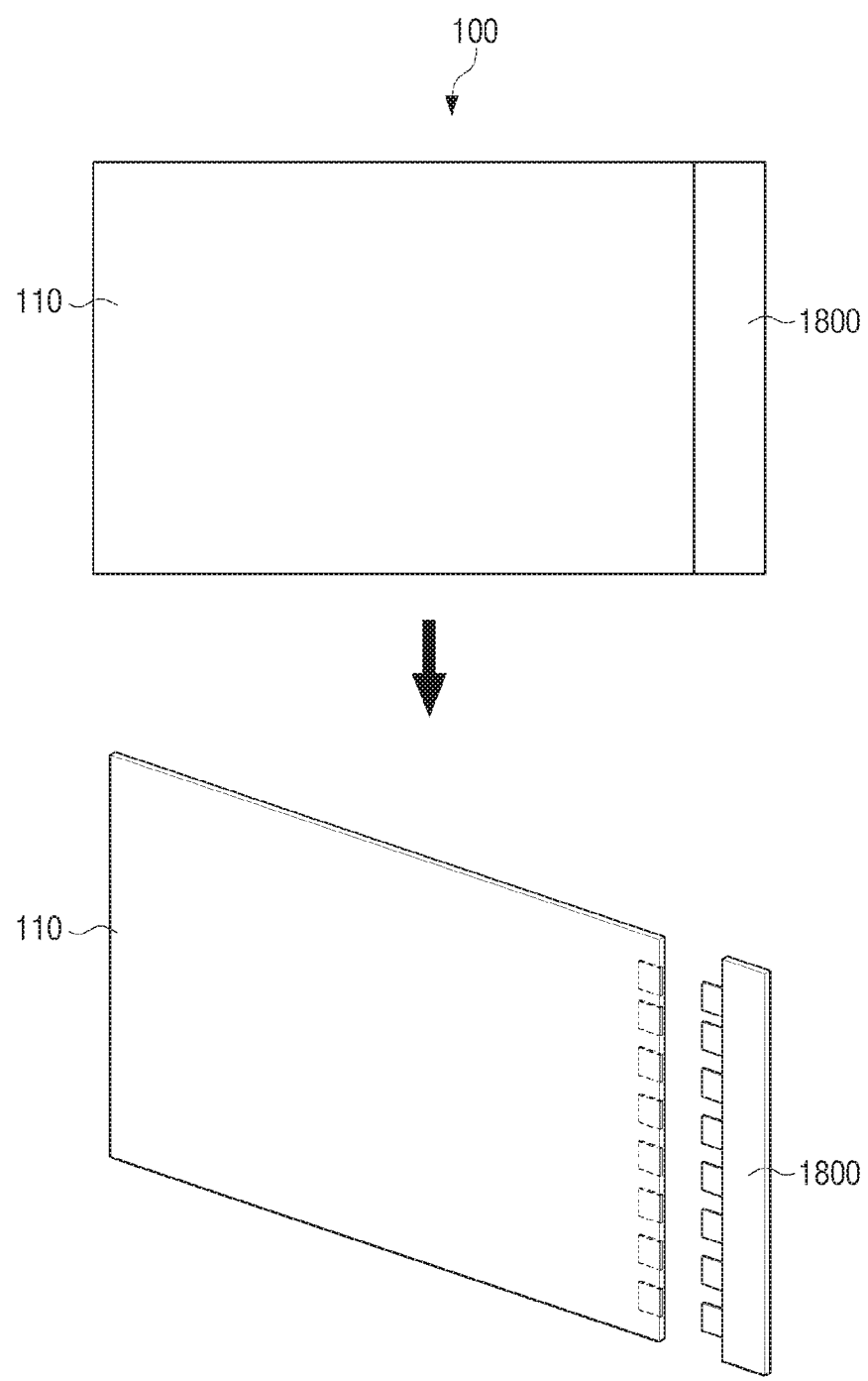
FIG. 35 is a view illustrating a flexible display apparatus according to an exemplary embodiment.

FIG. 35 is a view illustrating a flexible display apparatus according to an exemplary embodiment. Referring to FIG. 35, the power supply 1800 is provided on one edge of the flexible display apparatus and is attachable and detachable.

The power supply 1800 is made of a flexible material and can be bent along with the display 110. Specifically, the power supply 1800 includes a cathode collector, a cathode electrode, an electrolyte, an anode electrode, an anode collector, and a sheath covering the aforementioned members.

For example, the collector may be implemented by using an alloy such as TiNi having good elasticity, metal such as copper and aluminum, etc., a conductive material such as metal coated with carbon, carbon, and a carbon fiber, or a conducting polymer, etc. such as polypyrole.

The cathode electrode may be manufactured by a negative electrode material such as metal such as lithium, natrium, zinc, magnesium, cadmium, hydrogen storage alloy, and lead, etc., nonmetal such as carbon, and a high polymer electrode material such as organosulfur.

The anode electrode may be manufactured by a positive electrode material such as sulfur and metal sulfide, lithium transition metal oxide such as LiCoO2, and a polymer electrode material such as SOCl2, MnO2, Ag2O, Cl2, NiCl2, and NiOOH etc. The electrolyte may be implemented in a gel form using PEO, PVdF, PMMA, and PVAC.

The sheath may use a general polymer resin. For example, PVC, HDPE, or epoxy, etc. may be used. Besides these, any material that can prevent damage of a thread-type cell and is freely flexible or bendable may be used for the sheath.

Each of the anode electrode and the cathode electrode in the power supply 1800 may include a connector to be electrically connected to an external source.

Referring to FIG. 35, the connector protrudes from the power supply 1800 and a recess corresponding to a location, a size, and a shape of the connector is formed on the display 110. Accordingly, the power supply 1800 is connected with the display 110 as the connector and the recess are connected to each other. The connector of the power supply 1800 is connected to a power connection pad (not shown) of the flexible display apparatus 100 to supply power to the flexible display apparatus 100.

Although the power supply 1800 is attached to or detached from one edge of the flexible display apparatus 100 in FIG. 35, this is merely an example. A location and a shape of the power supply 1800 may be changed according to a product characteristic. For example, when the flexible display apparatus 100 has a predetermined thickness, the power supply 1800 may be mounted on a rear surface of the flexible display apparatus 100.

Figure 36:
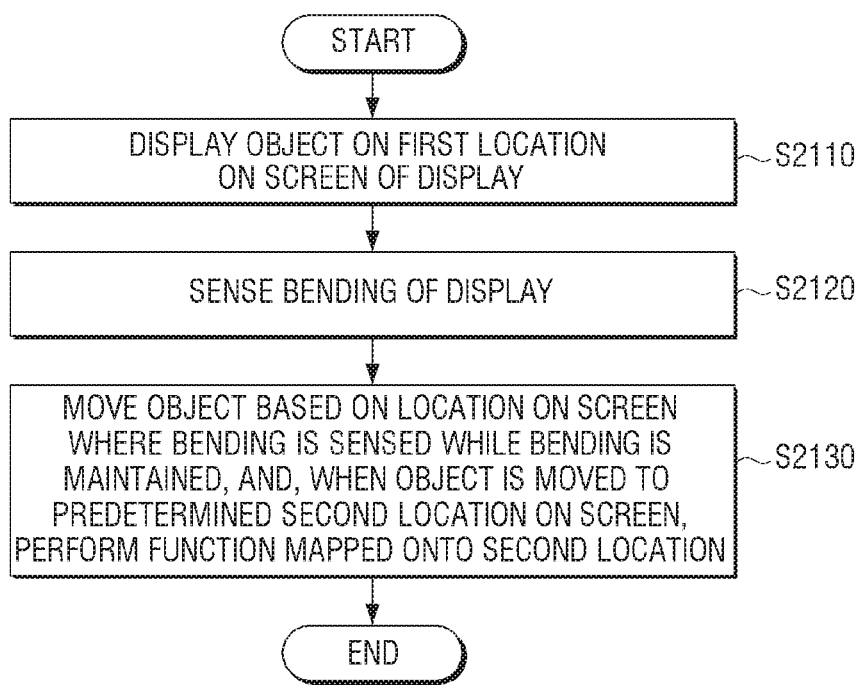
FIG. 36 is a flowchart illustrating a display method of a flexible display apparatus according to an exemplary embodiment.

FIG. 36 is a flowchart to illustrate a display method of a flexible display apparatus according to an exemplary embodiment.

First, an object is displayed on a first location on the screen of the display (S2110). That is, the object may be displayed on a predetermined location on the screen, and the predetermined location may be set at the time of manufacturing the flexible display apparatus 100 or may be set and changed by the user.

Bending of the display is sensed (S2120).

The object is moved based on a location of the sensed bending. When the object is moved to a predetermined second location on the screen, a function mapped onto the second location is performed (S2130).

Specifically, based on at least one of a location of the object displayed on the screen, a bending area on the screen, a bending direction, a degree of bending, and a bending duration, a moving direction, a moving distance, and a moving speed of the object displayed on the screen are determined, and the object is moved and displayed according to a result of the determining. A function corresponding to the movement of the object may be performed.

The screen recited herein is a lock screen, and, when the object is moved to the predetermined second location on the lock screen by the bending, an unlocking operation to unlock the lock screen may be performed.

When the lock screen is unlocked, a main screen is displayed, and, when one menu is selected on the main screen, a function corresponding to the selected menu is executed and an execution resulting screen is displayed.

When the display is bent in a first direction while the execution resulting screen is being displayed, at least one object included in the execution resulting screen is aligned on an edge area of the execution resulting screen and displayed. In this case, at least one of a size and a shape of the at least one object aligned on the edge area may be adjusted.

When the display is bent in a second direction which is opposite the first direction while the at least one object is aligned on the edge area and displayed, the at least one object is restored to the original state and displayed.

On the other hand, when the object on the lock screen is moved to the predetermined second location, the lock screen may be unlocked and an operation matching the second location may be automatically performed. For example, the operation matching the second location may be an operation of executing an application installed in the flexible display apparatus.

The screen may be a call connection screen which further includes a call connection menu and a call rejection menu. When an object on the call connection screen is moved to a location of the call connection menu by bending, a call connection operation may be performed, and, when the object is moved to a location of the call rejection menu, a call rejection operation may be performed.

On the other hand, a distance of the object movement may be adjusted differently according to a degree of bending of the display. That is, the moving distance of the object may be adjusted to be proportional to the degree of bending. Accordingly, as the degree of bending increases during the same bending holding time, the distance of the object movement increases. However, this is merely an example and a moving speed of the object may increase as the degree of bending increases.

The above-described exemplary embodiments have been described with reference to the accompanying drawings and thus a redundant explanation is omitted.

A non-transitory computer readable medium, which stores a program for performing the display method according to exemplary embodiments in sequence, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), memory stick, and a read only memory (ROM), and may be provided.

In the block diagram of the flexible display apparatus, a bus is not illustrated. However, the elements of the flexible display apparatus may communicate with one another through a bus. Also, the flexible display apparatus may further include a processor such as a CPU and a micro processor to perform the above-described various operations.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible display apparatus comprising:
a flexible display;
a sensor configured to sense a deformation of the flexible display; and
a processor configured to:
control the flexible display to display a first object in a first location and a second object in a second location on the flexible display, wherein the flexible display is flat,
based on the deformation of the flexible display, control the flexible display to move the first object displayed in the first location to the second location while the second object is maintained in the second location, and
based on the first object moving to the second location, execute a function associated with the second object displayed in the second location,
wherein the first object is moved along a line perpendicular to a bending line on the flexible display, and
wherein the bending line is a line which connects points at which a greatest resistance value is sensed by the sensor.

2. The flexible display apparatus as claimed in claim 1, wherein the processor is configured to control the flexible display to display a lock screen, and
wherein the processor is configured to determine whether the second object is associated with unlocking of the lock screen, and is configured to unlock the lock screen in response to determining that the second object is associated with unlocking of the lock screen.

3. The flexible display apparatus as claimed in claim 2, wherein the processor is configured to unlock and execute an application associated with the second object in response to determining that the second object is associated with unlocking of the lock screen and execution of the application.

4. The flexible display apparatus as claimed in claim 2, wherein the processor is configured to display a main screen in response to unlocking the lock screen.

5. The flexible display apparatus as claimed in claim 1, wherein the processor is configured to determine a location of the first object according to at least one of a degree of the deformation and a direction of the deformation.

6. A method of displaying information on a flexible display apparatus, the method comprising:
displaying a first object in a first location and a second object in a second location on a flexible display of the flexible display apparatus, wherein the flexible display is flat;
sensing deformation of the flexible display;
based on the deformation of the flexible display, moving the first object displayed in the first location to the second location on the flexible display, while the second object maintained in the second location; and
based on the first object moving to the second location, executing a function associated with the second object displayed in the second location,
wherein the first object is moved along a line perpendicular to a bending line on the flexible display, and
wherein the bending line is a line which connects points at which a greatest resistance value is sensed.

7. The method as claimed in claim 6, wherein the function comprises unlocking a lock screen of the flexible display apparatus.

8. The method as claimed in claim 7, wherein the function comprises unlocking the lock screen and executing an application associated with the second object displayed in the second location.

9. The method as claimed in claim 7, wherein the function comprises unlocking the lock screen and displaying a main screen of the flexible display apparatus associated with the second object displayed in the second location.

10. The method as claimed in claim 6, wherein the determining comprises determining a location of the first object based on at least one of a degree of the deformation and a direction of the deformation.

11. A flexible display apparatus comprising:
a flexible display;
a sensor configured to sense a deformation of the flexible display; and
a processor configured to:
control the flexible display to display a first object in a first location and a second object in a second location on the flexible display, wherein the flexible display is flat,
determine a direction of movement of the first object and an amount of the movement of the first object based on the deformation,
based on the direction of movement of the first object and the amount of the movement of the first object, determine a location of the first object on the flexible display at which the first object is to be displayed, control the flexible display to move the first object displayed in the first location to the second location according to determination of the location while the second object is maintained in the second location, and
based on the first object moving to the second location, execute a function associated with the second object displayed in the second location,
wherein the first object is moved along a line perpendicular to a bending line on the flexible display, and
wherein the bending line is a line which connects points at which a greatest resistance value is sensed by the sensor.

12. The flexible display apparatus of claim 11, wherein the processor is further configured to determine whether the second object displayed in the second location is associated with a function of the flexible display apparatus and execute the function based on the determining that the second object displayed in the second location is associated with the function.

13. The flexible display apparatus of claim 12, wherein the function comprises an unlock function to unlock a lock screen of the flexible display apparatus.

14. The flexible display apparatus of claim 12, wherein the function comprises an application execution function to execute an application of the flexible display apparatus.

15. The flexible display apparatus of claim 11, wherein the processor is configured to determine the location of the first object on the flexible display at which the first object is to be displayed based on a duration of the deformation.

16. The flexible display apparatus of claim 11, wherein the processor is configured to determine the location of the first object on the flexible display at which the first object is to be displayed based on a location of the deformation.

17. The flexible display apparatus of claim 16, wherein the processor is configured to determine the location of the first object on the flexible display at which the first object is to be displayed based on the first location with respect to the location of the deformation.

18. The flexible display apparatus of claim 11, wherein the first object and the second object comprises one of an icon and an image.

\* \* \* \* \*